US011648792B2

(12) United States Patent
Hsu et al.

(10) Patent No.: US 11,648,792 B2
(45) Date of Patent: May 16, 2023

(54) EMBEDDED VARIABLE CURVED SPIRAL PATTERNS

(71) Applicant: Idemia Identity & Security USA LLC, Billerica, MA (US)

(72) Inventors: Rein-Lien Hsu, Edison, NJ (US);
William M. O'Connor, Derry, NH (US); Ashley S. R. Tiguy, Billerica, MA (US); Yecheng Wu, Lexington, MA (US); Robert L. Jones, Andover, MA (US)

( * ) Notice: Subject to any disclaimer, the term of this patent is extended or adjusted under 35 U.S.C. 154(b) by 199 days.

(21) Appl. No.: 16/733,073

(22) Filed: Jan. 2, 2020

(65) Prior Publication Data

US 2020/0210796 A1 Jul. 2, 2020

Related U.S. Application Data

(60) Provisional application No. 62/787,507, filed on Jan. 2, 2019.

(51) Int. Cl.
*G06K 19/06* (2006.01)
*B42D 25/23* (2014.01)
(Continued)

(52) U.S. Cl.
CPC ......... *B42D 25/23* (2014.10); *G06F 16/9035* (2019.01); *G06F 16/93* (2019.01);
(Continued)

(58) Field of Classification Search
None
See application file for complete search history.

(56) References Cited

U.S. PATENT DOCUMENTS 10,489,643 B2 * 11/2019 Bertan ............... G06K 9/00892
10,679,105 B2 * 6/2020 Jones ............... G06K 19/06046
(Continued)

FOREIGN PATENT DOCUMENTS

CN 106778999 A * 5/2017
WO WO2012/159602 11/2012
(Continued)

OTHER PUBLICATIONS

PCT International Preliminary Report on Patentability in International Appln. No. PCT/US2020/012093, dated Jul. 15, 2021, 13 pages.
(Continued)

*Primary Examiner* — Thien M Le
*Assistant Examiner* — April A Taylor
(74) *Attorney, Agent, or Firm* — Victoria Bennett

(57) ABSTRACT

In general, the subject matter described in this specification relates to security credentials for documents, such as identification documents. One example is an identification document that includes a photographic image of an individual associated with the document, and a spiral pattern applied to a region of the identification document. The spiral pattern includes an elliptical spiral segmented into a plurality of arc segments, where wherein the arc segments of the spiral pattern encode identification data associated with the individual. Other implementations include corresponding processes, systems, apparatus, and computer programs related to generating and verifying identification documents with spiral patterns.

20 Claims, 13 Drawing Sheets

(51) Int. Cl.
  *G06F 16/93* (2019.01)
  *G06F 16/9035* (2019.01)
  *G06F 16/955* (2019.01)
  *G06K 7/14* (2006.01)
  *G06V 30/40* (2022.01)
(52) U.S. Cl.
  CPC ......... *G06F 16/9554* (2019.01); *G06K 7/143* (2013.01); *G06K 19/06131* (2013.01); *G06V 30/40* (2022.01)

(56) References Cited

U.S. PATENT DOCUMENTS

| | | |
|---|---|---|
| 2006/0115110 A1 | 6/2006 | Rodriguez et al. |
| 2008/0121728 A1 | 5/2008 | Rodriguez |
| 2009/0128858 A1* | 5/2009 | Kiuchi ................ B42D 25/337 358/3.28 |
| 2018/0130108 A1* | 5/2018 | Wu .................... G06Q 30/0607 |
| 2018/0186164 A1 | 7/2018 | Wu et al. |
| 2019/0311240 A1 | 10/2019 | Wicker et al. |

FOREIGN PATENT DOCUMENTS

| | | |
|---|---|---|
| WO | WO2017/091564 | 6/2017 |
| WO | WO2018/089679 | 5/2018 |

OTHER PUBLICATIONS

PCT Invitation to Pay Additional Fees and Provisional Opinion in International Application No. PCT/US2020/012093, dated Apr. 23, 2020, 14 pages.

PCT International Search Report and Written Opinion in International Application No. PCT/US2020/012093, dated Jun. 24, 2020, 20 pages.

* cited by examiner

LINECODE

EMBEDDED VARIABLE CURVED SPIRAL PATTERNS

CROSS-REFERENCE TO RELATED APPLICATION

This application claims the benefit of the filing date of U.S. Provisional Application No. 62/787,507, filed on Jan. 2, 2019. The contents of U.S. Application No. 62/787,507 are incorporated herein by reference in their entirety.

FIELD

The present specification is related to physical and digital identifications.

BACKGROUND

User identifications such as driver licenses can be issued either as physical identification cards or digital identifications. A physical identification card is issued by creating a card that includes customer information, whereas a digital identification is issued in an electronic format and accessed on a client device. Both physical and digital identifications are commonly used for verifying the identity of an individual, providing access to restricted areas, or authorizing an individual to purchase age-restricted content.

SUMMARY

Identifications are provided to customers by issuing authorities such as government agencies or companies during an issuance process. Such identifications include customer information that is used to identify the identity of the customer, and in some instances, provide access or privileges to the customer. However, security features for physical identification cards or digital identifications are often pre-configured during the issuance process and unable to be adjusted after issuance. As a result, such identifications are often susceptible to risk of fraud and counterfeiting when the pre-configured security features become compromised. In addition, besides the use of a unique identification number, many issued identifications often include general security features (e.g., holographic images, pre-configured background patterns) that are applicable to a general population of users that have been issued the same identification.

Implementations of the present disclosure include perceptible curved linecodes on physical or digital identification documents. In one example implementation, a spiral code, can be an extension of 1D line codes to 2D, that is used to encode data (e.g., ID holder data). A spiral line code can be configured to have similar traits to watermarks such as easy blending with the background of an identification. Furthermore, a spiral linecode may provide additional benefits over 1D linecodes and watermarks, such as being rotation and scale invariant.

In a second example implementation, line code technology can be used to implement curved lines for embedding data into a credential using, for example, laser engraving processes. In some implementations, a decodable pattern is introduced to the surface or subsurface of a card body via laser engraving. The decodable pattern may be implemented as straight or curved lines of symbols. Different types of line patterns, widths, and segments may be selected, arranged, and configured to embed data in various images, artwork, or text in a credential. A wave function can be used to control the laser engraving of the curved line code.

In some implementations, the aspects of both the first and second example implementations can be combined in one credential. For example, a given identification document can include both spiral and curved line codes.

In general, innovative aspects of the subject matter described in this specification can be embodied in an identification document that includes a photographic image of an individual associated with the document, and a spiral pattern applied to a region of the identification document. The spiral pattern includes an elliptical spiral segmented into a plurality of arc segments, where wherein the arc segments of the spiral pattern encode identification data associated with the individual. Other implementations include corresponding processes, systems, apparatus, and computer programs related to generating and verifying identification documents with spiral patterns. These and other implementations can each optionally include one or more of the following features.

In some implementations, the arc segments of the spiral pattern encode a web address.

In some implementations, characteristics of the spiral pattern encode authentication data. In some implementations, the characteristics of the spiral pattern include a center position and an orientation.

In some implementations, the arc segments include a first arc segment having a first arc length, and a second arc segment spaced from first arc segment, the second arc segment having a second arc length greater than the first arc length.

In some implementations, the spiral pattern is overlaid on a background of the identification document.

In some implementations, the identification document is a physical identification card. In some implementations, the spiral pattern is printed on a layer of the identification document.

In some implementations, the identification document is a digital identification document.

In some implementations, the identification document includes a segmented line pattern having a wave shape.

In another general aspect, innovative aspects of the subject matter described in this specification can be embodied in methods that include actions of obtaining an image of a document, identifying, within the image, a spiral pattern applied to a region of the document, determining, from the spiral pattern, spiral data that indicates characteristics of the spiral pattern, determining, based on the spiral pattern and the spiral data, secure information of an individual associated with the document, and verifying the document based on the secure information. Other implementations of this aspect include corresponding systems, apparatus, and computer programs, configured to perform the actions of the methods, encoded on computer storage devices. These and other implementations can each optionally include one or more of the following features.

In some implementations, the spiral data includes a list of multiple spiral patterns identified on the document.

In some implementations, verifying the document includes determining that the spiral data corresponds with expected spiral patterns from a spiral pattern repository.

In some implementations, the spiral pattern includes a plurality of arc segments, and determining the secure information includes determining arc lengths associated with at least a subset of the arc segments based on the spiral characteristics, and determining the secure information from the arc lengths of the subset of arc segments.

In some implementations, determining the secure information from the arc lengths arc lengths of the subset of arc segments includes determining digital data represented by the arc lengths of the subset of arc segments, and determining the secure information from the digital data.

Some implementations include providing, for display to a user, the secure information.

In some implementations, the spiral characteristics include a location of a center point of the spiral pattern on the document.

In some implementations, the spiral characteristics include a location of a center point of the spiral pattern on the document and wherein the center point of the spiral pattern indicates an direction for reading the secure information from the arc lengths.

In another general aspect, innovative aspects of the subject matter described in this specification can be embodied in methods that include actions of obtaining verified credential information associated with a holder of the document, encoding the verified credential information within a pattern of line segments, converting line segments in the pattern of line segments into arc segments by applying a set of spiral characteristics to provide a spiral pattern, and applying the spiral pattern to a region of the document. Other implementations of this aspect include corresponding systems, apparatus, and computer programs, configured to perform the actions of the methods, encoded on computer storage devices. These and other implementations can each optionally include one or more of the following features.

In some implementations, the spiral characteristics include a spiral controlled orientation (φ) and a center point (Cx,Cy), and wherein converting line segments in the pattern of line segments into arc segments comprises generating the spiral pattern based on a polar to Cartesian coordinate conversion including the following relationship:

$$x(t)=u(t)*\cos(\phi)-v(t)*\sin(\phi)+Cx,$$

$$y(t)=u(t)*\sin(\phi)+v(t)*\cos(\phi)+Cy,$$

wherein x(t) and y(t) are Cartesian coordinates representing dimensions on the document, and wherein u(t) and v(t) are polar coordinates representing of the spiral pattern.

In another general aspect, innovative aspects of the subject matter described in this specification can be embodied in methods that include actions of obtaining card type data and/or user data to be embedded in a document, determining one or more line features to be implemented in the document, determining a wave function associated with a graphic to be implemented in the document, and controlling an embedding device to embed user data in the document based on the one or more line features and the wave function. Other implementations of this aspect include corresponding systems, apparatus, and computer programs, configured to perform the actions of the methods, encoded on computer storage devices. These and other implementations can each optionally include one or more of the following features.

Some implementations include obtaining verified credential information associated with a holder of the document, encoding the verified credential information within a pattern of line segments, converting line segments in the pattern of line segments into arc segments by applying a set of spiral characteristics to provide a spiral pattern, and applying the spiral pattern to a region of the document.

In some implementations, the spiral characteristics include a spiral controlled orientation (φ) and a center point (Cx,Cy), and wherein converting line segments in the pattern of line segments into arc segments comprises generating the spiral pattern based on a polar to Cartesian coordinate conversion including the following relationship:

$$x(t)=u(t)*\cos(\phi)-v(t)*\sin(\phi)+Cx,$$

$$y(t)=u(t)*\sin(\phi)+v(t)*\cos(\phi)+Cy,$$

wherein x(t) and y(t) are Cartesian coordinates representing dimensions on the document, and wherein u(t) and v(t) are polar coordinates representing of the spiral pattern.

Particular implementations of the subject matter described in this specification can be implemented so as to realize one or more of the following advantages. Implementations may blend into a curvilinear background of an identification document seamlessly, while still being readily detectable by identification verification systems. For example, a spiral linecode may have the appearance of an identification holder's fingerprint and pass unrecognized as a security feature. Implementations may provide robust alignment, rotation, and scaling resistance to the error of card alignment during scanning. For example, a curved or spiral linecode may be more easily detectable and decipherable by identification card scanning systems even when the identification is not exactly aligned with a scanning device. For instance, the center point of a spiral line code may serve as an anchor point for detection and decoding algorithms used by identification verification systems. Moreover, curved or spiral linecodes may be more graphically more compact than other types of coding (e.g., one dimensional linear linecodes). For example, spiral linecodes may fit into more compact regions of identification documents.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
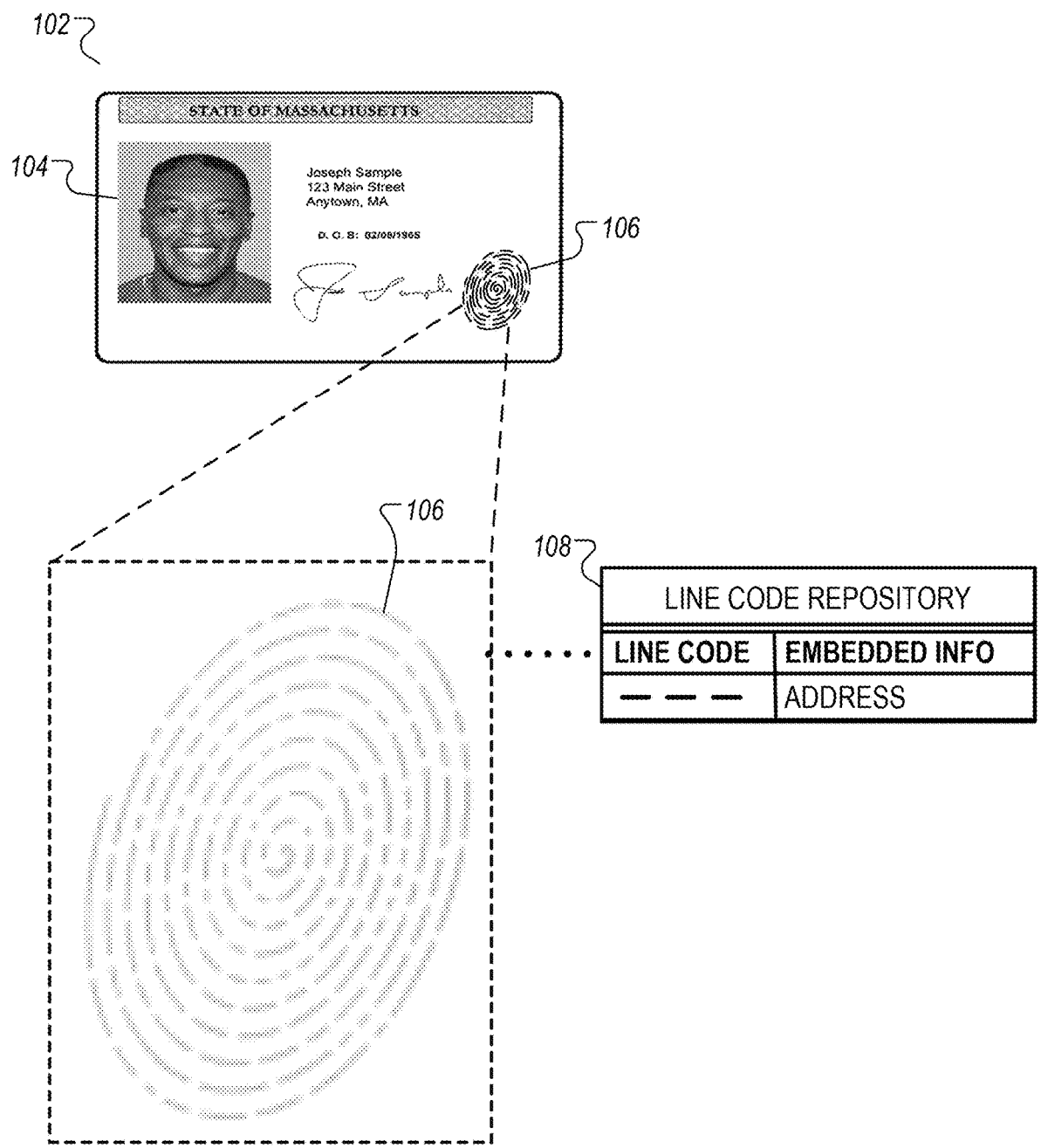
FIG. 1A illustrates an example of a physical identification with an exemplary spiral pattern applied to the identification.

Credentials, such as driver's licenses or passports, are frequently implemented in the form of physical or digital cards. Credentials may include, for example, credit cards, bank cards, phone cards, passports, driver's licenses, network access cards, employee badges, debit cards, security cards, visas, immigration documentation, national ID cards, citizenship cards, permanent resident cards (e.g., green cards), medicare cards, medicaid cards, social security cards, security badges, certificates, identification cards or documents, voter registration cards, police ID cards, border crossing cards, legal instruments, security clearance badges and cards, gun permits, gift certificates or cards, and membership cards or badges. The terms "credential," "document," "card," "badge" and "documentation" are used interchangeably throughout this specification.

Credentials may be used for a variety of reasons, for example, to provide identity information of a credential holder or user, to verify the age of a credential holder, to prove driving privileges, to access a secure area, and to conduct financial transactions. Because a large number of user transactions rely on the authenticity of credentials, implementing security features to ensure the validity and genuineness of a credential is important. Security features may be embedded into identification documents.

One method of implementing security features in credentials is through the use of laser engraving. Laser engraving is advantageous for several reasons. For example, laser engraving does not require the use of ink, may be more durable than ink printing, more resistant to abrasion, and provide higher print and resolution quality than ink-based printed credentials. Through these advantages, the costs for manufacturing credential cards is reduced while the overall quality and durability of a credential card is improved. In addition, the lack of reliance on chemicals and solutions, also makes laser engraving more environmentally friendly.

Laser engraving may be performed to implement lines in a card and embed data. In general, various suitable lasers, such as an Yttrium Aluminum Garnet (YAG) laser, may perform the laser engraving. Laser engraving can be used to generate grayscale images, portraits, and text on a card.

In general, a system is capable of generating identifications that include distinctive spiral patterns corresponding to different portions of secure customer information (e.g. spiral linecodes). For example, the system generate a spiral pattern having particular characteristics that encode authentication data. The spiral characteristics can include, but are not limited to, a user-defined orientation and center position. For example, a particular identification issuing authority may generate spiral patterns having an orientation and center position that is unique to that issuing authority. These spiral characteristics can then serve as an authentication feature for the identification document, e.g., a verification system can readily recognize that a document having a different spiral orientation and/or center position as false. Furthermore, the spiral pattern can be segmented into arc segments of variable arc length. The arc segments can define a linecode that encodes customer data, e.g., personal information of the identification holder including, but not limited to, ID number (e.g., Driver's license number), date of birth, social security number, or a combination thereof.

The system can either verify the authenticity of an identification by determining the validity of the secure customer information associated with each spiral pattern, verifying the arrangement of the distinctive spiral patterns within the identification, or both. For instance, once the identification has been issued, the system can detect the embedded spiral patterns within the identification in order to identify corresponding secure customer information. The secure customer information can then be used to authenticate the customer. Alternatively or in addition, the system can detect the arrangement of the spiral, e.g., orientation and center point, in order to verify the authenticity of the identification. For example, a unique spiral orientation and center location may be chosen as an authentication feature for a particular identification issuing authority.

A "customer" may refer to a user or individual. For example, a customer may be an individual with a physical identification card that may be a driver's license issued by a department of motor vehicles of a territory or a municipality. In other instances, the identification card may be other types of identifications such as a social security card, a passport, a birth certificate, or other government or company-issued identification cards.

A customer may be provided with a digital identification by enrolling into a digital identification program offered by a digital identification administrator. In some instances, the digital identification administrator may also be the issuing authority. In other instances, the digital identification administrator may be another organization that is authorized by the issuing authority to manage the issuance and maintenance of identification cards.

A customer may opt to enroll into the digital identification program using various methods such as, for example, an online enrollment process, a form submission, or through an oral agreement with an authorized representative. The digital identification administrator may then create a customer entry including customer information in a digital identification database. For instance, the customer information may include one or more of an email address, an identification number, a customer photograph, and other types of demographic information (e.g., home address) associated with the customer. The digital identification database may also indicate to the digital identification administrator that an entry for the customer has been successfully created once the entry for the customer has been created.

The enrollment process for the digital identification program may include the use of various methods to receive customer information, such as, for example, the use of email, the use of a customer token such as a personal identification number (PIN), and/or the use of customer biometric parameters.

FIG. 1A illustrates an example of a physical identification with spiral patterns embedded within an identification document. In the example, an identification 102 includes a customer photograph 104 and an embedded spiral pattern 106. The spiral pattern 106 is applied to a region of the identification 102. In some implementations, the spiral pattern 106 is overlaid on a background of the identification document.

The spiral pattern 106 includes a spiral shaped line that is segmented into a plurality of arc segments. As discussed in more detail below, the characteristics of the spiral shape, the arc segments (e.g., length and pattern of arc segments), or both can encode authentication data of the identification 102. The authentication data can include, but is not limited to, personal credentials of the card holder, data unique to an issuing authority, or a combination thereof.

In some implementations, the spiral pattern 106 can have an "Archimedes' spiral" shape, as described in the polar coordinates (r=a θ$^{(1/h)}$ where n=1. In some implementations, the spiral pattern is generated as an elliptical spiral with a user-controlled orientation (φ) and a center (Cx,Cy) as follows:

$$u(t)=A\cos(2*\pi*t/N),$$

$$v(t)=B\sin(2*\pi*t/N), \text{ where } t=[0,\ldots N*N\text{Cycles}],$$

$$x(t)=u(t)*\cos(\phi)-v(t)*\sin(\phi)+Cx,$$

$$y(t)=u(t)*\sin(\phi)+v(t)*\cos(\phi)+Cy,$$

where x(t) and y(t) are Cartesian coordinates representing dimensions on an identification document.

In some implementations, each of the spiral pattern 106 can be distinctive from one another based on their spiral characteristics. Examples of spiral characteristics include, but are not limited to, spiral orientation (φ), spiral center position (Cx, Cy) on an identification document, a number of spiral cycles (N), spacing changes in spacing between spiral cycles, or a combination thereof. The spiral characteristics can serve as an authentication feature for the document. For example, particular issuing authorities can adopt unique spiral characteristics such that variation from those characteristics are indicative of an unauthentic identification 106.

In some implementations, error correction data can be encoded in the spiral characteristics. For example, values of the spiral orientation can encode parity information for verifying the accuracy of data decoded from the spiral arc segments. In some implementations, the spiral characteristics serve as a decoding key for decoding the spiral arc segments. For example, to accurately determine the length of individual arc segments a system may need to use characteristics of the spiral to map linear measurements to a polar coordinate system that matches the spiral's characteristics (e.g., orientation and curvature of each arc segment).

In some implementations, the center point of the spiral pattern 106 can serve as a reference point for concealing and detecting the beginning and end points of data encoded in the arc segments. For example, usable customer data (e.g., personal information of the identification holder) can be concealed within the spiral pattern 106 by including a predefined number of dummy arc segments before and after arc segments that encode the customer data. For example, starting from the center point of the spiral, a particular spiral pattern 106 may include 3 dummy arc segments, followed by several arc segments encoding data, followed by 4 more dummy arc segments.

In the case of a physical identification document (e.g., an ID card), the spiral pattern 106 can be printed or engraved on a layer of the identification 102. Although the figure illustrates spiral patterns being embedded within a physical identification, in other instances, the spiral patterns 106 can also be embedded within a digital identification (e.g., a digitally issued driver license). In addition, although the example depicted illustrates visibly detectable spiral patterns (e.g., visible to a human eye), in other instances, the spiral patterns can be constructed small enough to appear invisible to the human eye. In such instances, the spiral patterns can outline micro-features of the customer photograph 104 (or other portions of the identification 102).

In some implementations, each of the spiral pattern 106 can be distinctive from one another based on their line attributes. Examples of line attributes can include the spacing of line segments within a pattern line, the thickness of the pattern line, the color of the pattern line, among others. As described above, the spiral pattern is also associated with a portion of secure customer information. The secure customer information can be identified within a spiral pattern repository 108 that includes mappings between each spiral pattern and corresponding secure customer information. As depicted, the spiral pattern 106 is mapped to a verified Date of Birth.

The detection of the spiral patterns 106 and associated secure customer information can be used to verify the authenticity of the identification 102. As an example, verification data for the identification 102 can specify the spiral patterns 106, the arrangement of the spiral patterns 106, and/or the associated credential information included within the spiral pattern repository 108. In this example, a detector device may compare detection data obtained from an identification presented by a customer to the verification data for the identification 102. For instance, if the detector device fails to detect each of the spiral patterns 106, or detects an incorrect arrangement of the spiral patterns 106, then the detector device may determine that there may be likelihood that the presented identification may be fraudulent.

In another example, secure customer information obtained from the detected spiral patterns of a presented identification can be used to authenticate a customer in addition to the credential information specified by the identification (e.g., name, date of birth, address, etc.). In this example, spiral patterns 106 can be included and/or embedded within the identification to securely authenticate a customer without exposing sensitive secure customer information that is not displayed on the identification 102 (e.g., social security number). In this regard, spiral pattern detection can be used to securely verify sensitive customer information.

Figure 1B:
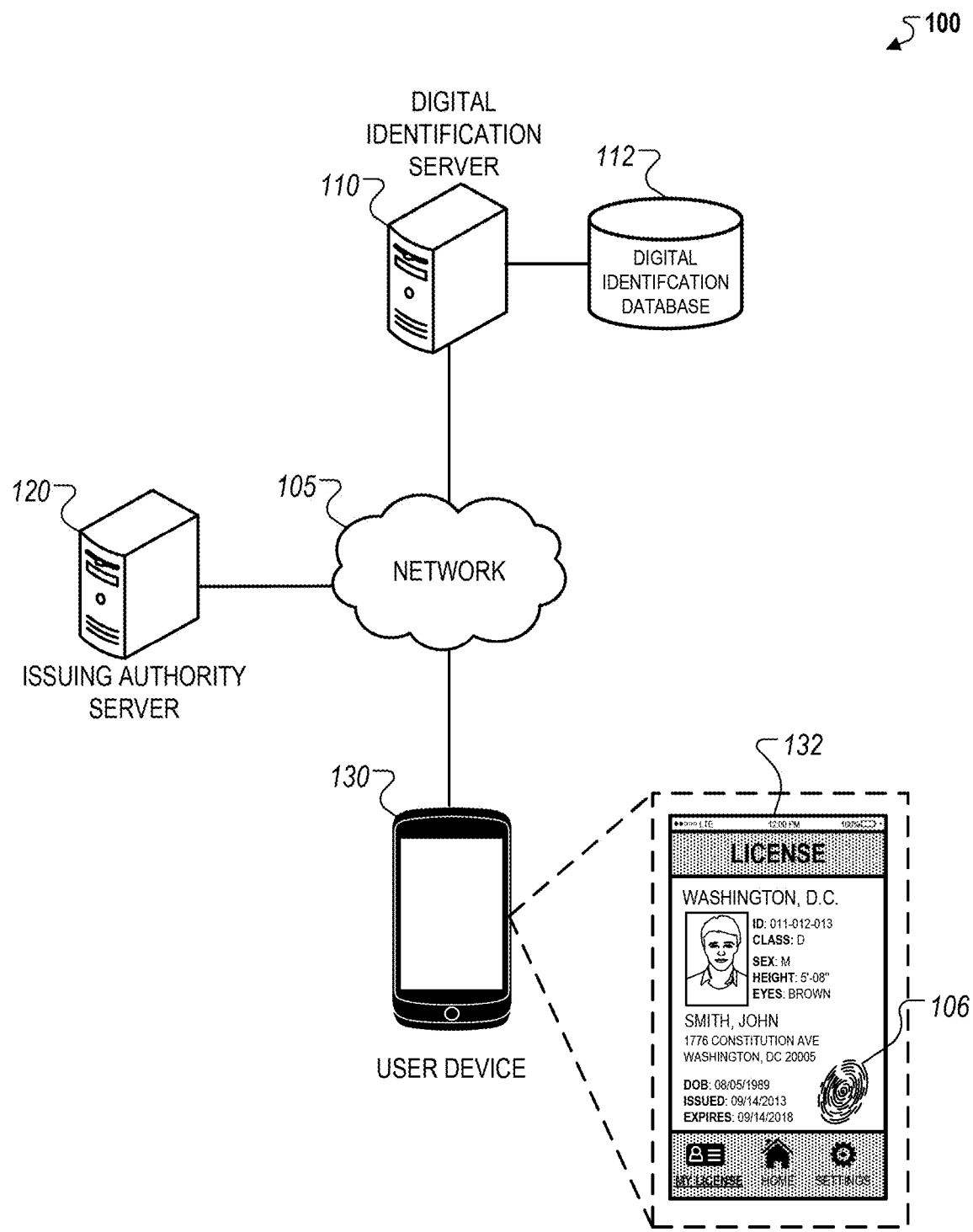
FIG. 1B illustrates an example of a system that generates documents with embedded spiral patterns.

FIG. 1B illustrates an example of a system 100 for generating digital identifications that include spiral patterns for encoding data. In general, the system 100 may be used for various processes associated with a digital identification 132 (e.g., spiral pattern detection as described previously with respect to FIG. 1A). In addition, the system 100 may be used to initially enroll customers into a digital identification program, and provision a digital identification 132 to enrolled customers.

Briefly, the system 100 may include a digital identification server 110, an issuing authority server 120, and a customer device 130 connected over a network 105. The digital identification server 110 may also be configured to exchange communications with a digital identification database 112. In addition, the customer device 130 may display a digital identification 132 on a user interface presented to a customer (e.g., a customer or any other authorized user) on the customer device 130. Although the digital identification 132 is depicted as a digital driver license in FIG. 1B, the digital identification 132 may alternatively be a digital form of any physical identification card issued to a customer from various types of identification issuing authorities (e.g., a government agency or a company).

In general, the system 100 can be used to embed spiral patterns 106 within physical or digital documents and/or assign portions of secure customer information to each of the spiral patterns included within a document (e.g., digital identification 132). As described above, the spiral patterns 106 can be included to enable the system 100 to verify the authenticity of an identification presented by a customer and/or authenticate the customer based on extracting assigned credential information for each line segment.

Figure 1C:
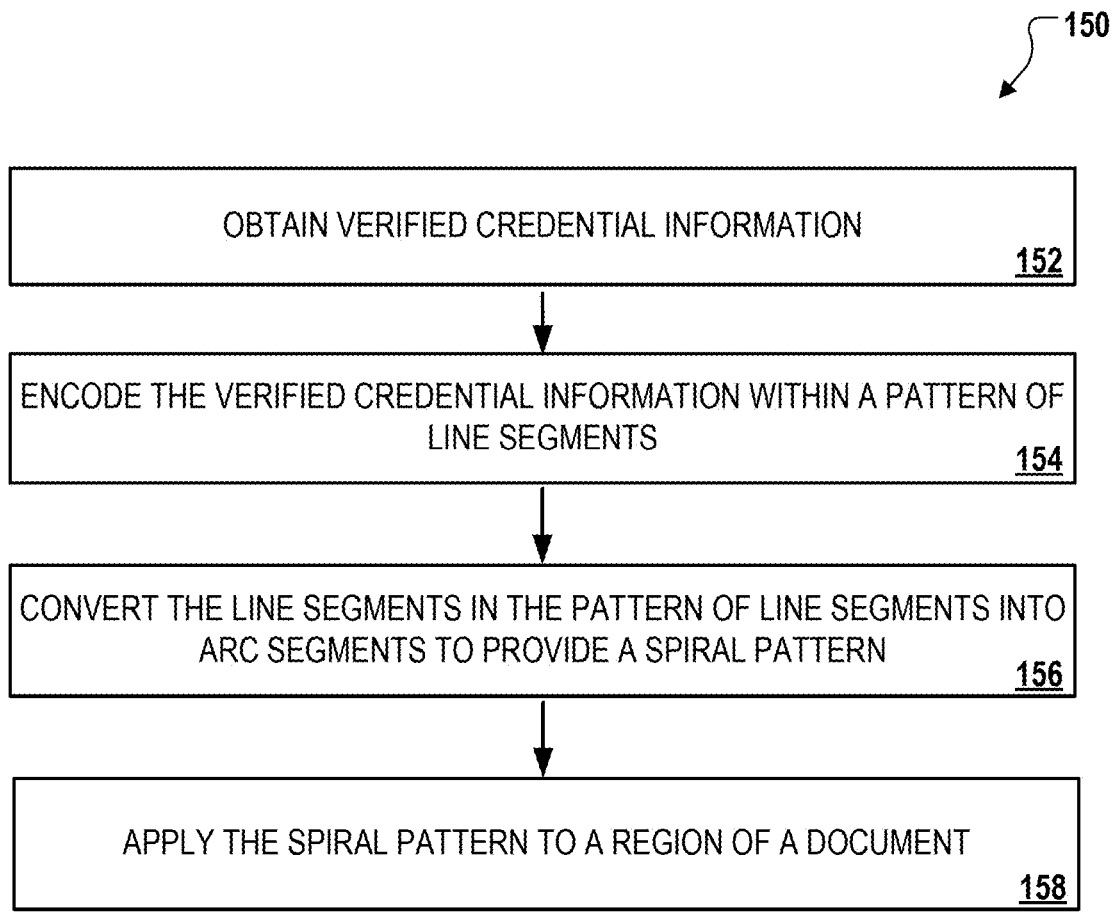
FIG. 1C shows a flow diagram of an example process for generating documents with embedded spiral patterns.

For instance, the system 100 can be used to execute process 150 of FIG. 1C to apply a spiral pattern 106 to a document such as an identification document. With reference to FIGS. 1A-1C, the system 100 obtains verified credential information (152). For example, the system 100 can obtain verified credential information associated with a holder or issuer of a document. The digital identification server 110 can obtain verified credential information stored within a customer record of the digital identification database 112. The verified credential information can include data collected and vetted by a government entity (e.g., department of motor vehicles).

The system 100 encodes the verified credential information within a pattern of line segments (154). For example, during an issuance process of the digital identification 132, the digital identification server 110 may generate one or more line segments to include within the newly generated digital identification 132. The digital identification server 110 can associate portions of the verified credential information with each of the generated line segments.

The system 100 converting line segments in the pattern 106 of line segments into arc segments to provide a spiral pattern (156). For example, the line segments can be converted to arc segments based on characteristics of a spiral pattern, where the arc segments represent the verified credential information. As noted above, the spiral characteristics can include, but are not limited to, spiral orientation (φ), spiral center position (Cx, Cy) on an identification document, a number of spiral cycles (N), spacing changes in spacing between spiral cycles, or a combination thereof. In some examples, the line segments can be converted to arc segments by generating the spiral pattern based on a polar to Cartesian coordinate conversion represented by:

$$u(t)=A\cos(2*\pi*t/N),$$

$$v(t)=B\sin(2*\pi*t/N), \text{ where } t=[0,\ldots N*N\text{Cycles}],$$

$$x(t)=u(t)*\cos(\phi)-v(t)*\sin(\phi)+Cx,$$

$$y(t)=u(t)*\sin(\phi)+v(t)*\cos(\phi)+Cy,$$

where x(t) and y(t) are Cartesian coordinates representing dimensions of the document.

The system applies the spiral pattern 106 to a region of the document (158). For example, the system 100 can apply a graphical image of the spiral pattern to digital identification 132. In some examples, the system 100 can embed the spiral pattern on a layer of a physical document by, e.g., printing or engraving the pattern on the document.

In some implementations, once the digital identification server 110 associates the spiral patterns 106 with portions of the verified credential information, the digital identification server 110 may then generate a spiral pattern repository and store it within the digital identification database 112. The digital identification server 110 may also generate a new digital identification including designated line segments for issuance. After the digital identification 132 has been issued to the customer, the data included within stored spiral pattern repository can be used to identify the spiral patterns and/or the spiral pattern arrangement that is expected to be included within a verified copy of identification 132.

Additionally or alternatively, information contained within the spiral pattern repository can be used to generate time-variant representations of the digital identification 132. For example, the spiral pattern repository may specify a time-limited combination of spiral patterns included within the digital identification 132 and corresponding credential information for each spiral pattern. In such implementations, the spiral pattern can be periodically changed by the digital identification server 110 in order to increase the security of the digital identification 132. For example, if a customer transaction includes a digital identification with an expired spiral pattern combination (e.g., from a prior configuration), then the digital identifications server 110 may determine that the included digital identification may be a counterfeit identification.

Referring now to the individual components of the system 100, the network 105 may be configured to enable electronic communications between the digital identification server 110, the issuing authority server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 can also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the digital identification 132 to a customer. In some instances, the organization or institution operating the digital identification server 110 may be an organization that is designated by the identification issuing authority to access identification information for a plurality of customers who have been issued a physical identification card. In other instances, the organization or institution operating the digital identification server 110 may be the identification issuing authority (e.g., a government institution) that issues a plurality of customers with a physical identification card.

The digital identification server 110 may coordinate and administer the backend processes that are involved in provisioning a digital identification to the plurality of customers that have been issued a physical identification from the identification issuing authority. For instance, the digital identification server 110 may initiate processes to enroll customers with the digital identification 132, and operate security protocols to detect potential fraudulent use or privacy breaches associated with the digital identifications. In some instances, the processes related to the digital identification 132, as described above, may be coordinated with the issuing authority server 120, to ensure that secure customer information that includes personally identifiable information are not exposed during the provisioning of the digital identification 132.

As described, secure customer information may refer to customer information within the digital identification 132 that may include personally identifiable information associated with the customer such as, for example, social security numbers, place of residence, and/or other demographic information that is associated with other types of information that the customer considers private. In addition, the secure customer information may include medical records of the customer that are protected under the Health Insurance Portability and Accountability Act of 1996 (HIPAA). Access to the secure customer information within the digital identification 132 may be restricted by associated the secure customer information to different spiral patterns and specifying the associations within the spiral pattern repository as described above.

The digital identification server 110 may exchange communications with the digital identification database 112, which includes customer information for enrolled customers and/or other configuration details related to the digital identification program. For instance, the digital identification database 112 may include a customer entry associated with a customer that includes account information associated with enrolled customers, and any type of customer information that may be provided by the customer during a digital identification enrollment process.

In some implementations, the digital identification database 112 may include customer entries for both customers that are enrolled in the digital identification program and potential customers that the digital identification server 110 has identified as customers that are likely to enroll in the digital identification program. For example, the digital identification database 112 may include a field that indicates whether a customer entry is associated with an enrolled customer or a potential customer. In such implementations, the digital identification database 112 may be accessed by the digital identification server 110 to retrieve customer information for the digital identification 132 associated with an enrolled customer, and customer information for a candidate customer in order to send an enrollment email that provides an enrollment code to the candidate customer.

In some implementations, the customer entry for enrolled customers may be automatically created by the digital identification server 110 within the digital identification database 112. In such implementations, the customer may submit an online enrollment form including a set of user fields for providing customer information. In response, the digital identification server 110 may initiate a computer-implemented procedure that automatically generates a customer entry for the customer in the digital identification database 112 and inserts the values submitted for the set of user fields as customer information that is included in the customer entry.

In some implementations, the digital identification server 110 may additionally exchange communications with an image server, which stores photographs associated with a customer identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure customer information that is included in physical identification cards issued by the issuing authority. For instance, the issuing authority server 120 may provide access to demographic information of customers, historical information associated with customers (e.g., previous identification cards issued, number of renewals, etc.), and/or other types of customer information using authorization procedures that require validation of access credentials. For example, upon receiving a request for the secure customer information by the digital identification server 110, the issuing authority server 120 may require an exchange of the access credentials to validate an authorized request.

The issuing authority server 120 may be queried by the digital identification server 110 for secure customer information during a digital identification operation. For instance, during an enrollment process, after a customer has opted to enroll into a digital identification program, the digital identification server 110 may query the issuing authority server 120 using a customer identifier number to extract secure customer information to be included in a generated digital identification 132. In another example, during a verification operation, the digital identification server 110 may access the issuing authority server 120 to determine whether a digital identification 132 for a customer includes false customer information indicative of a fraudulent digital identification 132.

In some implementations, the issuing authority server 120 may be configured with additional security protocols compared to the digital identification server 110 to protect sensitive customer information associated with the customer. For instance, in some instances, the issuing authority server 120 may be associated with a Federal government agency that manages nationwide programs that require specialized access (e.g., a government clearance). In such instances, the digital identification server 110 may be configured to access the secure customer information stored within the issuing authority server 120 under a special security agreement that ensures that the exchange of the secure customer information is controlled and regulated according to Federal privacy statutes. For example, the issuing authority server 120 may track information related to each exchange with the digital identification server 110 such that in the event that the digital identification server 110 determines that a particular digital identification 132 is invalid, a notification may be received by the issuing authority server 120 to take additional security measures to protect more sensitive customer information that may be associated with, but not included in, the digital identification 132. In this regard, the communication exchange between the digital identification server 110 and the issuing authority server 120 may be utilized to ensure protection of customer information beyond the customer information included in the digital identification 132.

The customer device 130 may be a portable electronic computing device that displays the digital identification 132 associated with a customer. For instance, the customer device 130 may be, for example, a smart phone, a tablet computer, a laptop computer, a personal digital assistant device, an electronic pad, a smart watch, a smart glass, or any electronic device with a display that is connected to a network.

The customer device 130 exchanges communications with the digital identification server 110 to receive and transmit enrollment information related to the digital identification program, customer data that is included in the digital identification, credential data used to verify the authenticity of the digital identification 132, and/or configuration settings that adjust the display of the digital identification 132 on the customer device 130. For example, during an online enrollment process, the customer may use the customer device 130 to input customer information and an assigned access code for the digital identification program, which is then transmitted to the digital identification server 110 to generate the digital identification 132. In another example, during a verification process, when the digital identification 132 is enabled on the customer device 130, a data packet including credential data may be transmitted to the digital identification server 110 to determine whether the digital identification 132 is still valid or includes accurate information. In this example, if the digital identification server 110 determines that the credential data is valid, then the digital identification may be determined to be valid. Alternatively, if the digital identification server 110 determines that the credential data is not valid, then the digital identification 132 may be determined to be invalid.

In some implementations, the customer device 130 may include a mobile application that exchanges communications to the digital identification server 110 as an application server. For example, the mobile application may be associated with a customer account that is stored on the digital identification database 112. In addition, the mobile application may periodically exchange information related to the security status assigned by the digital identification server 110 to determine whether the digital identification 132 is valid. In some instances, the mobile application may additionally or alternatively include various displays of the digital application such that the mobile application may be used as a replacement form of identification to a physical identification card.

The digital identification 132 may be displayed on a user interface on the customer device 130. For example, as shown in FIG. 1A, the digital identification 132 may include a photograph of a customer, a customer identifier, categorical data (e.g., identification classification), demographic information (e.g., sex, height, eye color, home address), date of birth, etc.), and issuance information associated with a corresponding physical identification card. In some instances, the digital identification may be a digital image of the corresponding physical identification card. In such implementations, the appearance of the digital identification may be substantially similar to the physical identification and consequently used as a duplicate form of identification.

In some implementations, spiral patterns 106 can be used to encode a web address. For example, for a given URL (web address), (e.g., www.ABC_company.com, encode the alphabets into code using a table, for example, the ASCII code table. In this case, www.ABC_company.com may become: 119 119 119 46 105 100 101 109 105 97 46 99 111 109. The encoded URL from step can be converted to binary bit array, for example, 01010001 . . . which can be encoded in line segments as discussed above. The line segments can be printed as a straight line code, converted to a spiral pattern (as discussed above), or converted to a curved (e.g., wave) line code pattern (as discussed below in reference to FIGS. 5-9) and applied to a document.

Figure 2A:
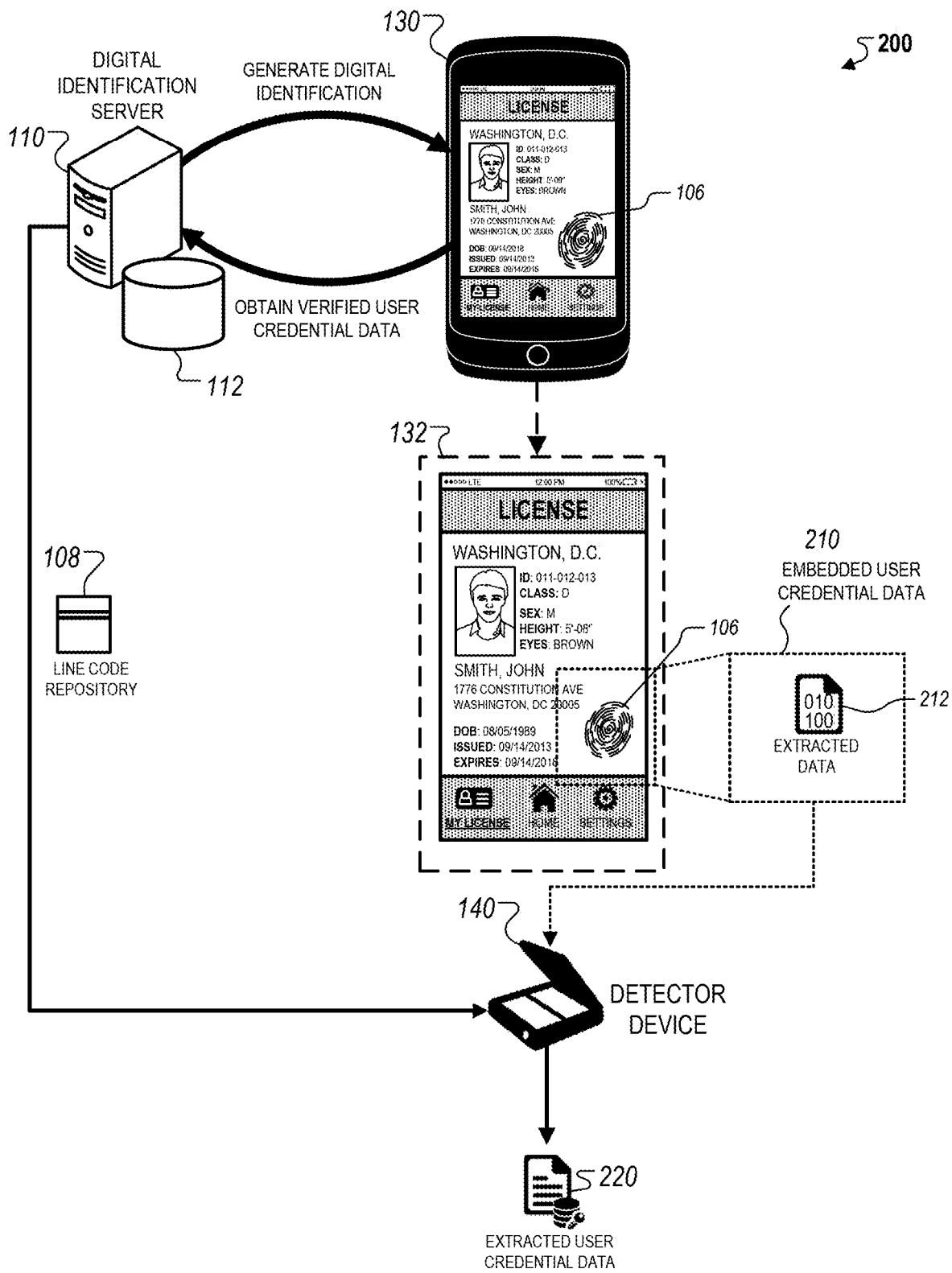
FIG. 2A illustrates an example of a system for verifying a document based on data extracted from embedded spiral pattern of an identification.

FIG. 2A illustrates an example of a system 200 for verifying a digital identification based on data extracted from embedded spiral patterns 106 of the digital identification 132. Although FIG. 2A illustrates a system that extracts data from a digital identification, similar systems and techniques can also be employed for a physical identification card such as the identification 102 depicted in FIG. 1A.

The digital identification server 110 initially obtains secure customer information using different techniques. In some instances, the secure customer information may be obtained during the enrollment process when the customer is requested to verify his identity by providing personally identifiable information (e.g., social security number, user authentication information, etc.). The obtained customer information can then be stored and associated with designated spiral patterns 106. Additionally or alternatively, the secure customer information can also be obtained from an electronic database of a verified source such as the issuing authority. For example, during the enrollment process for obtaining a digital driver license, the digital identification server 110 may obtain secure customer information associated with a customer record within the state department of motor vehicle database. In this example, the secure customer information can represent vehicle identification numbers that are currently registered with the customer record, among other types of personally identifiable information.

Figure 2B:
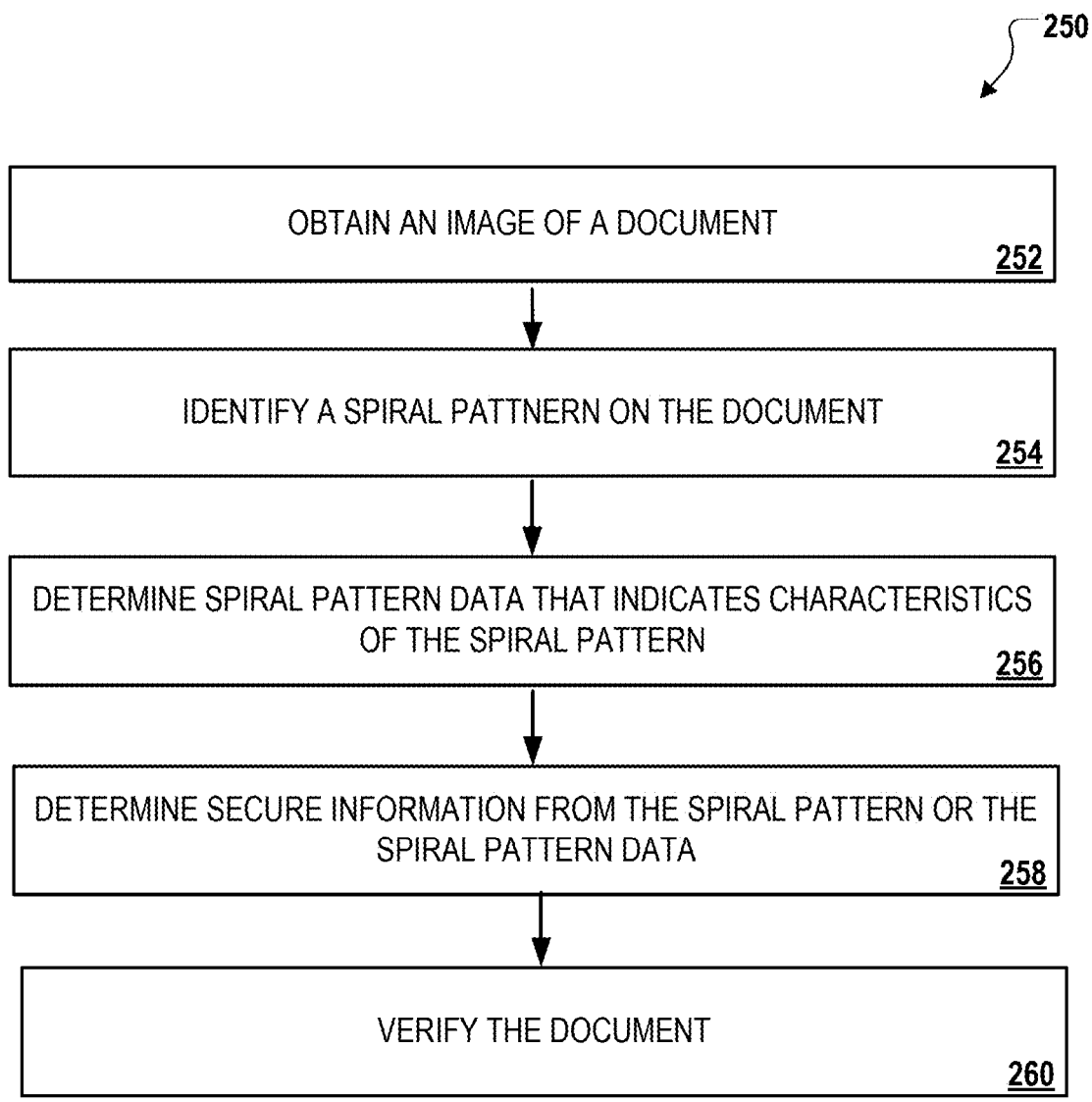
FIG. 2B shows a flow diagram of an example process for verifying documents with embedded spiral patterns.

For instance, the system 200 can be used to execute process 250 of FIG. 2B to verify a document (e.g., a digital or physical identification document). With reference to FIGS. 2A and 2B, the system 200 obtains an image of the document (252). For example, the system 200 can use detector device 140 to scan or photograph a physical document or a screen of a customer device 130 to obtain an image of a digital identification displayed thereon.

The system 200 identifies a spiral pattern 106 applied to a region of the document (254). For example, this can be accomplished using various types of optical recognition techniques. For instance, the detector device 140 can be configured to recognize designated spiral patterns that are included within the spiral pattern repository 108. For example, the detector device 140 can implement a localization algorithm to identify the spiral pattern on the identification. Example localization algorithms can include, but are not limited to, Radon transform, finger core detection, a curvature mapping.

The system 200 determines spiral pattern data 212 that indicates characteristics of the spiral pattern (256). For example, during a verification operation of the digital identification 132, the detector device 140 extracts spiral pattern data 212 within the digital identification 132. During a scan of the digital identification 132, the detector device 140 may identify the presence of the designated spiral patterns, and extract the identified spiral patterns as the extracted spiral pattern data 212. The extracted spiral pattern data 212 may specify, for example, a list of spiral patterns detected within the digital identifications, and a set of associated information for each detected spiral pattern. For example, the spiral pattern data 212 may specify characteristics of a particular spiral pattern such as a coordinate location within the digital identification of the center point and/or orientation of the particular spiral pattern, as discussed above. In these examples, the associated spiral characteristics can be used to distinguish between true spiral pattern detection and false positive spiral pattern detection by the detector device 140, as discussed above.

The system 200 determines secure information of an individual associated with the document (258). For example, the system 200 uses the spiral pattern, the spiral data, or both to determine the secure information. For example, the detector device 140 can then determine secure customer information 210 assigned to the extracted spiral pattern data 212 using the information specified within the spiral pattern repository 108. For example, the detector device 140 can use spiral characteristics to measure arc lengths of individual arc segments of a spiral pattern 106. The detector device 140 can use the measured arc lengths to decode data encoded by the arc segments. For example, the detector device 140 can map the arc segments to digital data represented by the arc length of the arc code segments (discussed in more detail below in reference to FIG. 3). As another example, the detector device 140 can convert the arc segments into line code segments based on the measured arc lengths. The line code segments can be mapped to digital data represented by the length of the line code segments.

As another example, the detector device 140 may cross-reference each of the detected spiral patterns indicated by the extracted spiral pattern data 210 with the spiral patterns that are specified within the spiral pattern repository 108 in order to determine the pieces of customer information assigned to each spiral pattern. As an example, referring back to FIG. 1A, the detection of the spiral pattern 106a within the digital identification 132 would enable the detector device 140 to obtain a verified social security number that is stored in the spiral pattern repository 108.

The system verifies the document (260). For example, the detector device 140 can use both the extracted spiral pattern data 210 and the extracted secure customer information 212 to perform various types of verification operations of the digital identification 132. In one example, the detected spiral patterns within the extracted spiral pattern data 210 can be cross-referenced against a list of verified spiral patterns specified by the spiral pattern repository 108 in order to determine the authenticity of the digital identification 132. In this example, if the extracted spiral pattern data 210 does not include one or more of the verified spiral patterns, then detector device 140 may determine that there is a likelihood that the digital identification 132 is a counterfeit.

In another example, the arrangement of detected spiral patterns within the digital identification 132 can also be cross-referenced against a verified arrangement specified by the spiral pattern repository 108. In this example, the detector device 140 may determine that the digital identification 132 may be a counterfeit even if all of the verified spiral patterns are detected but in an incorrect arrangement. In each of these examples, the sensitivity of counterfeit detection can be adjusted based on the quality of the digital identification (e.g., image resolution), the scanning and/or recognition capabilities of the detector device, or other aspects that may impact the detection of the spiral patterns. In addition, the sensitivity of counterfeit detection may also be adjusted based on the type of verification operation performed.

In some implementations, the extracted secure customer information 212 can be used to authenticate a customer during an electronic transaction in which the customer provides the digital identification 132 as an authentication document. In such implementations, the extracted secure customer information 212 is used to verify a customer identity associated with the digital identification 132. For instance, because the spiral patterns encode customer information that is not displayed on the digital identification 132, detection of spiral patterns enables the detector device 140 to obtain additional customer information to verify a claimed customer identity of the digital identification 132.

As an example, during an online transaction, a customer provides the digital identification 132 for authenticating a claimed customer identity. In response, the detector device 140 obtains customer information displayed on digital identification 132 to identify the claimed customer identity. The detector device 140 scans the digital identification 132 to extract the spiral pattern data 210. The detector device 140 then identifies the secure customer information 212 assigned to the detected spiral patterns using the information specified by the spiral pattern repository 108. The detector device 140 finally verifies the claimed customer identity based on using the secure customer information 212 to verify the authenticity of the digital identification 132.

Figure 3:
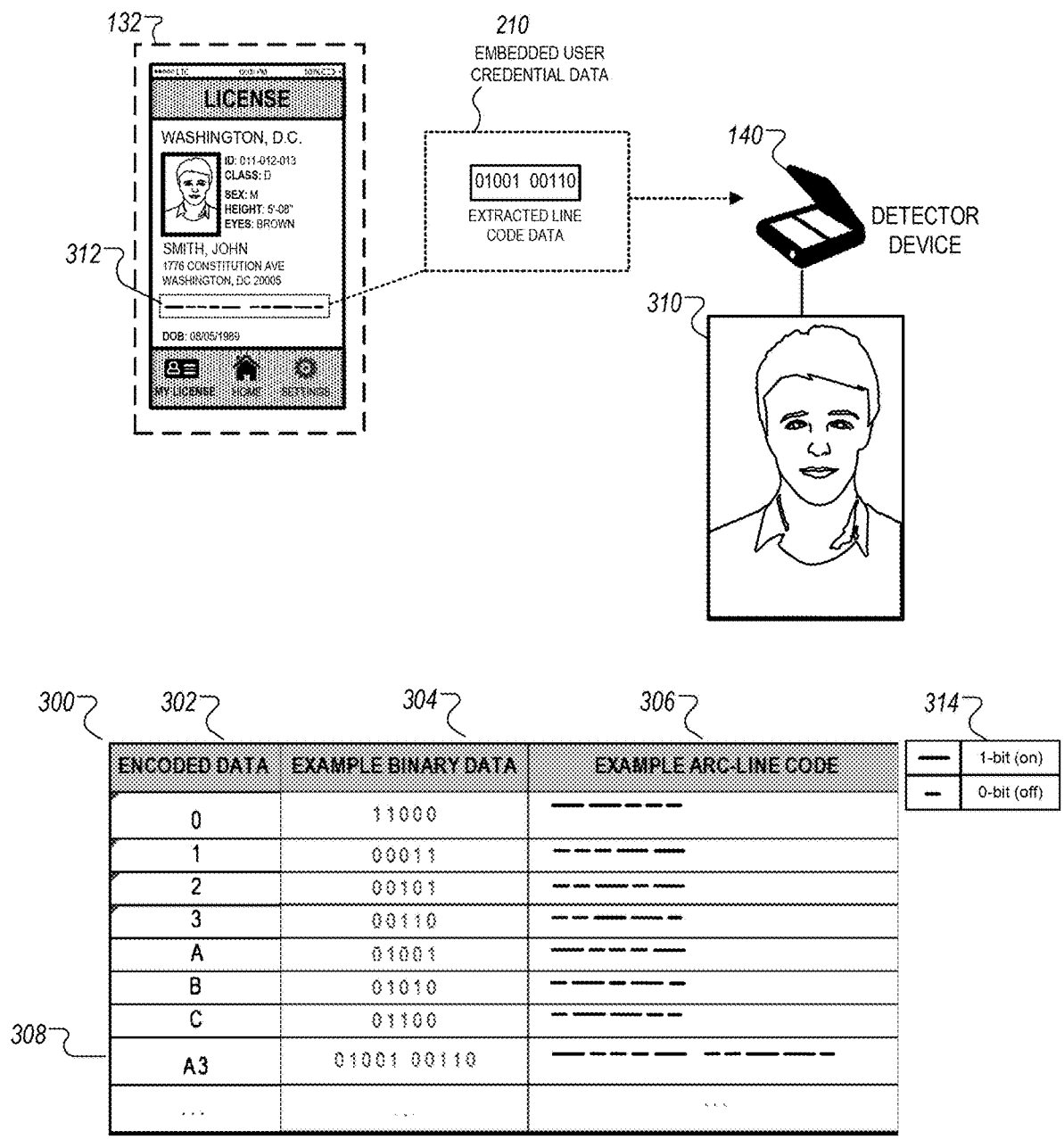
FIG. 3 illustrates an example of a table including examples of encoded arc segment data viewable by a detector device based on extraction of at least one encoded credential data.

FIG. 3 illustrates a table 300 including example encoded credential data viewable by detector device 140. Table 300 includes encoded data 302, binary data 304, and arc code data 306. The arc code data 306 is illustrated in linear form, e.g., following arc length measurements performed based on a polar coordinate measurements using the characteristics of a given spiral. As shown, encoded data 302 is data generally viewable within digital identification 132. Table 300 includes multiple distinct encoded data items that collectively are referred to herein as encoded data 302. Encoded data 302 includes data such as decimal values and alphanumeric values. In some implementations, the decimal values and alphanumeric values can be combined, arranged, or generally used to indicate an individual's name, age, gender, date of birth, address, identification number, and identification class.

In general, table 300 depicts example line code (spiral patterns/segments) that can be used to encode numerical values and alphabetical characters. In various implementations, the thickness of the lines depicted in the example arc code 306 can vary depending on the type of information being embedded within an example identification. With regard to static lines (non-line code) that are used to create an image/card data depicted on an identification item, the various portions of arc code 306 will not be a part of the lines used to depict card data. Instead example arc code 306 will be embedded as a spiral pattern 106 within a background pattern of the identification item.

Table 300 includes multiple distinct binary data code sequences that collectively are referred to herein as binary data 304. Binary data 304 includes computer readable code sequences that a processing unit of a computing device can receive and process to extract or obtain encoded data 302. As shown in table 300, unique binary code sequences can correspond to certain encoded data. For example, a binary sequence of "01001" can correspond to the letter "A," thus, various binary sequences can be arranged to indicate the name of the identification card owner. In another example, a binary sequence of "00110" can correspond to the numerical value "3," thus, one or more binary sequences corresponding to numerical values can be arranged to indicate the age of the identification card owner.

Table 300 includes multiple distinctive spiral patterns that collectively are referred to herein as arc code data 306. As described above, spiral patterns can be formed using arc segment sequences in which certain arc segments include different arc lengths and/or thicknesses relative to other line segments. As shown in FIG. 3, legend 314 indicates that longer arc segments correspond to a bit value of "1" while shorter arc segments correspond to a bit value of "0." Moreover, spacing between line segment pairs can vary as well. For example, for spiral patterns that include multiple arc segment pairs, the spacing between arc segments of a first line segment pair can be different from the spacing between arc segments of a second arc segment pair.

As shown in table 300, unique line code data can correspond to certain encoded cardholder data. For example, a spiral pattern that includes arc segments of lengths " — — —— — —— " (e.g., as converted to linear line segments for readability) can correspond to a decimal value of 2, while a spiral pattern that includes arc segments of lengths " —— —— —— — " can correspond to a decimal value of 3. Hence, in some implementations, the aforementioned arc segments can be scanned and decoded to indicate the age (e.g., 23) of the identification card owner. In some implementations, spiral patterns shown in FIG. 3 represent only a portion of longer spiral patterns that may, for example, extend horizontally from left to right at various sections of digital identification 132 or is corresponding physical card equivalent.

In some implementations, physical or digital identifications can include spiral patterns with arc segments that have a thickness of approximately 7.5-micron. In other implementations, arc segment thicknesses can be greater than or less than 7.5-microns. In general, the lengths or spaces between the arc segments can be varied as needed depending, at least in part, on the amount of data that is to be encoded by a particular spiral pattern.

In some implementations, spiral patterns with arc segments that have an approximate thickness of 7.5-micron can be combined with related sets of offset print lines. The related offset print lines can have a thickness that corresponds to the thickness of the spiral patterns (e.g., approximately 7.5-micron) used to encode certain cardholder data. In some instances, offset lines of corresponding thickness can be preprinted in a background image of an example identification.

In some implementations, arc segments used to encode certain sensitive information can be disposed or placed within an identification in an alternating pattern relative to other print lines. Example placement patterns can include every third print line viewable on the identification being composed of spiral pattern segments that have a thickness corresponding to, or consistent with, the offset print lines. In alternative implementations, to enhance viewing clarity and improve authentication processes, spiral pattern segments can have a slightly larger thickness relative to preprinted background lines. Spiral pattern segments can be also be printed or otherwise disposed in the identification using a variety of colors to also aid in enhancing viewing clarity.

As described above, in some implementations, detector device 140 can be configured to scan digital identification 132 and the spiral patterns embedded within the digital identification 132 to extract one or more secure user customer information. In FIG. 3, detector device 140 scans digital identification 132 to extract the spiral pattern data 210. As shown, digital identification 132 can include an example spiral pattern 312 embedded with the digital identification 132 (or a physical card). In some instances, encoded line data can be decoded, in part, by scanning or capturing an image of an example identification (e.g., digital identification 132) with a computing device such as a smartphone, a digital camera, or a laptop computing device.

Figure 4:
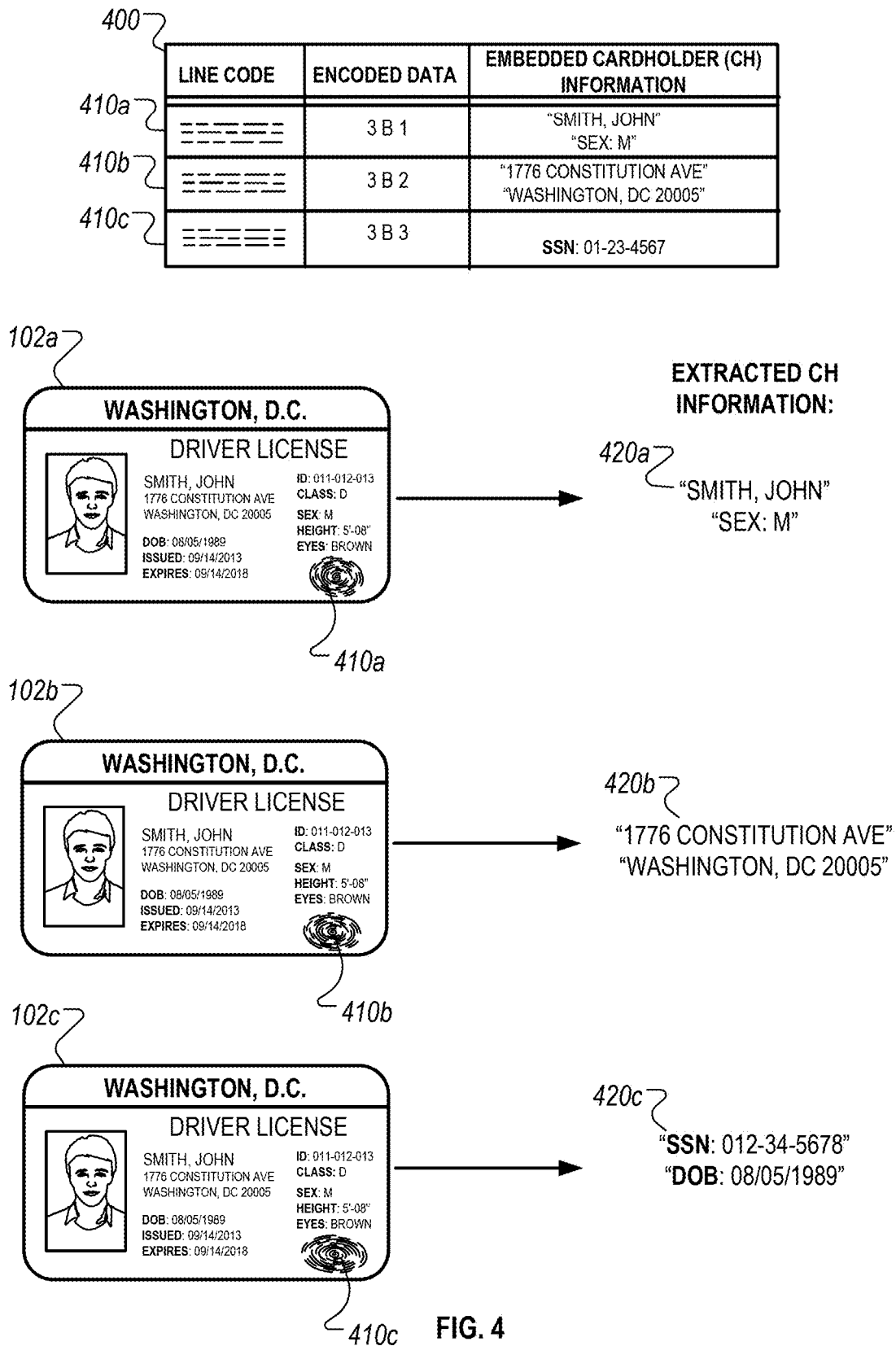
FIG. 4 illustrates examples of decoded credential data that can be extracted from sets of encoded data.

FIG. 4 illustrates example decoded/detected credential data that can be extracted from examples of encoded spiral pattern data. FIG. 4 includes table 400, identification 102a/b/c (e.g., a card or article), spiral pattern features 410a/b/c and extracted data 420a/b/c. In some implementations, spiral pattern feature 410a can be extracted using, for example, detector device 140. As indicated above, detector device 140 can include a screen configured to display, to a user, the encoded data that corresponds to spiral pattern feature 410a. In one implementation, upon extraction of line code associated with feature 410a, a user of detector device 140 can view, on the display screen of device 140, embedded cardholder information corresponding to, for example, the name and gender/sex of the cardholder. Additionally, embedded cardholder information corresponding to address information and social security number can be displayed by device 140 in response to extraction of line code associated with features 410b and 410c respectively.

As shown in FIG. 3, in one implementation, a detector device 140 can scan identification 102a to extract encoded data 420a associated with spiral pattern feature 410a. The extracted encoded data 420a can include the name of the cardholder and the gender of the cardholder. In another implementation, detector device 140 scans identification 102b to extract encoded data associated with spiral pattern feature 410b. The extracted encoded data 420b can include the first line of the cardholder's address and the second line of the cardholder's address. In yet another implementation, detector device 140 scans identification 102c to extract encoded data associated with spiral pattern feature 410c. The extracted encoded data 420c can include the cardholder's social security number and/or the cardholder's date of birth.

In general, spiral patterns embedded within an example physical or digital identification (e.g., card or displayed image on a device) can be formed using a series of lines that create the appearance of a wave going across the face of the identification. For physical cards, ink jet printers, ultraviolet (UV) laser printers, YAG laser printers, or any other suitable print device can be used to produce the embedded spiral patterns described in this specification.

In some examples, with regard to physical identification cards, an identification card designer can utilize a YAG laser to embed one or more lines between, for example, the colored or non-colored lines associated with the standard text/print of an identification card. This example card can already include a photograph of the card owner as well as the card owner's demographic information. Embedded spiral pattern data would then be included on top of, for example, a pre-printed background information associated with the identification.

Figure 5:
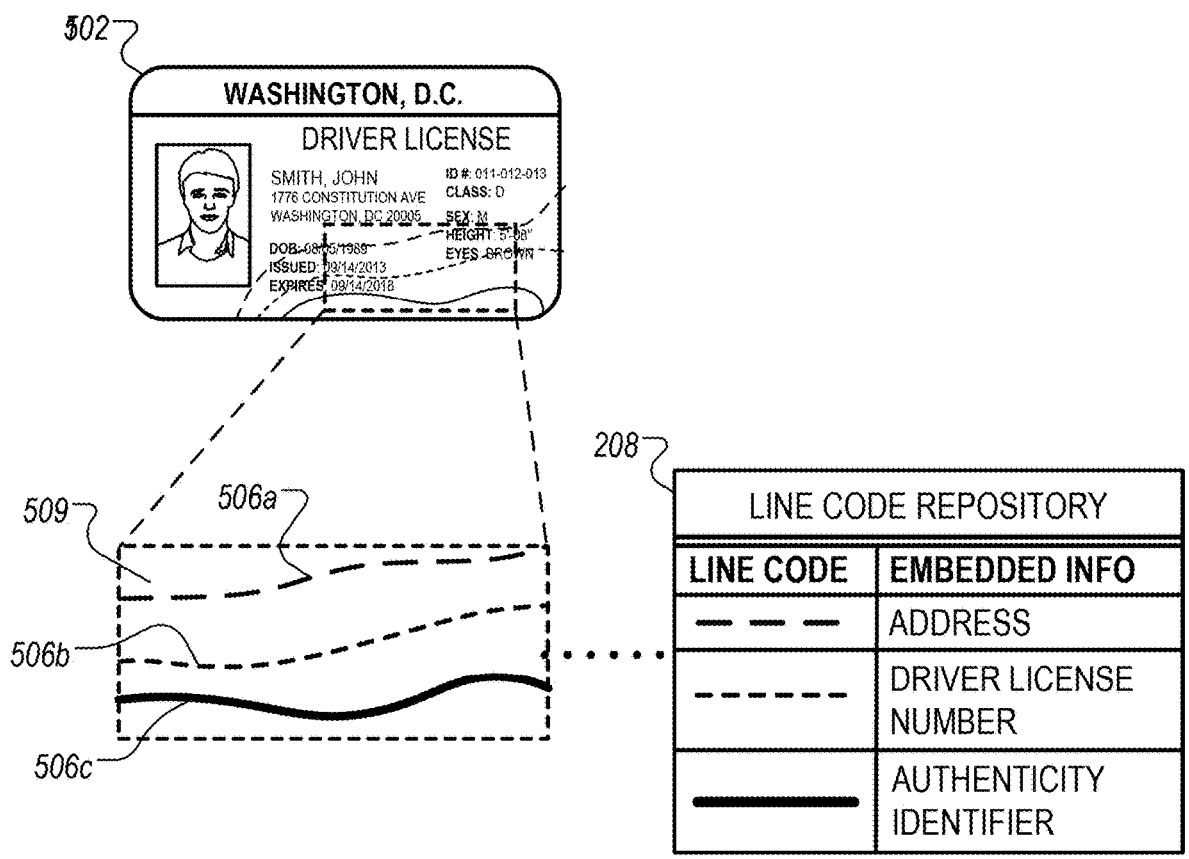
FIG. 5 illustrates an example of an identification document with embedded line segment data according to a second example implementation.

FIG. 5 illustrates an example of a physical identification document (e.g., an ID card) with line patterns embedded at a certain region/area of the document. In the example, ID card 502 includes a customer photograph and embedded line patterns 506a, 506b, and 506c. Card 502 is constructed such that different regions or areas of the card 502 are outlined with different patterns. For example, line pattern 506a outlines a line pattern having a first spacing characteristic, line pattern 506b outlines a line pattern having a second spacing characteristic that differs from the first (i.e., smaller length), and line pattern 506c includes a solid line portion that can indicate an authenticity identifier.

In some implementations, lines associated with a particular pre-print pattern may have certain line portions removed. The removed line portions therefore create an area/space 509 in which line segments associated with line code can be embedded. In some implementations, the line code may be configured in a curved manner that can be used to create outlines of particular patterns such as buildings, state capitals, state birds, or any other background pattern or image outline corresponding to a particular authority indicator/identifier for a given jurisdiction. In some implementations, the line patterns are used as part of the image data associated with an ID card. The line patterns may be used to securely embed encoded data that relate to identifying features of an individual.

Although the figure illustrates line patterns 506a-c being embedded within a card, in other instances, the line patterns 506a-c may also be embedded within a digital identification (e.g., a digitally issued driver license). In addition, although the example depicted illustrates visibly detectable line patterns (e.g., visible to a human eye), in other instances, the line patterns may be constructed small enough to appear invisible to the human eye. In such instances, the line patterns may outline micro-features of a customer photograph (or other portions of the card 502).

Each of the line patterns 506a, 506b, and 506c are distinctive from one another based on their line attributes. Examples of line attributes include the spacing of line segments within a pattern line, the length of the pattern line, the width of the line pattern, the color of the pattern line, among others. As described above, the line pattern is also associated with a portion of secure customer information. The secure customer information may be identified within a line pattern repository 508 that includes mappings between each line pattern and corresponding secure customer information. As depicted, the line pattern 506a is mapped to customer address, the line pattern 506b is mapped to a driver license number, and the line pattern 506c is mapped to an authenticity identifier.

The detection of the line patterns 506a-c and associated secure customer information may be used to verify the authenticity of the card 502. As an example, verification data for the card 502 may specify the line patterns 506a-c, the arrangement of the line patterns 506a-c within the card 502, and/or the associated credential information included within the line pattern repository 508. In this example, a detector device (described below) may compare detection data obtained from a card presented by a customer to the verification data for the card 502. For instance, if the detector device fails to detect each of the line patterns 506a-c, or detects an incorrect arrangement of the line patterns 506a-c, then the detector device may determine that the presented card should be presented for second level inspection as it may be a fraudulent ID card.

In another example, secure customer information obtained from the detected line patterns of a presented card may be used to authenticate a customer in addition to the credential information specified by the card (e.g., name, date of birth, address, etc.). In this example, line patterns may be included and/or embedded within the card to securely authenticate a customer without exposing sensitive or personally identifiable information (e.g., driver license number). In this regard, line pattern detection may be used to securely verify sensitive customer information.

Figure 6:
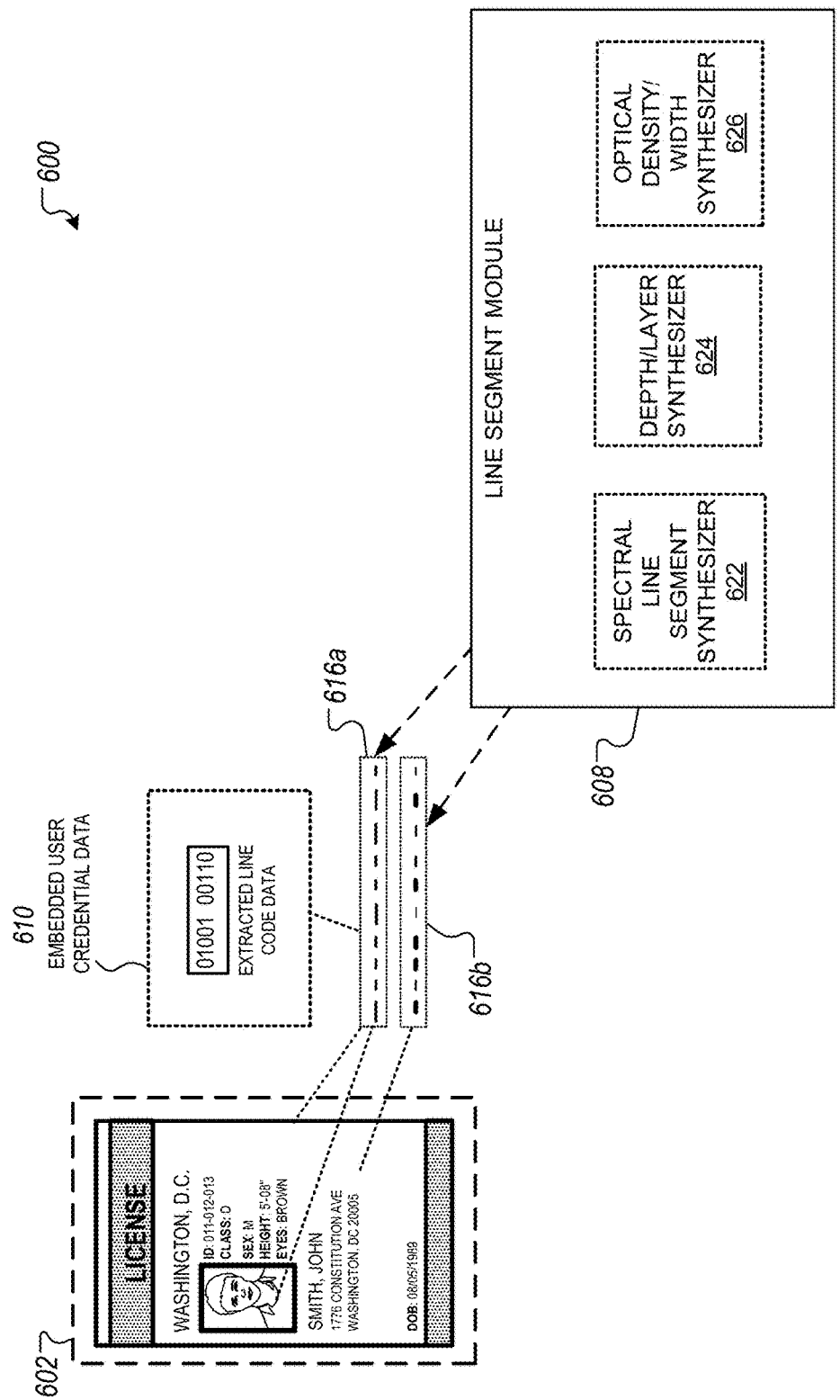
FIG. 6 illustrates an example system for embedding information in a document or card in accordance with the second implementation.

FIG. 6 illustrates an example system 600 for embedding information in an ID card 602 using different line segment code technologies. ID card 602 may be digital or physical identification card that includes embedded line segments that are used to encode credential data for an individual. The credential data may include personally identifiable information about an individual, such as a person's address, date of birth, or driver's license number. As described in more detail below, the line patterns and line segments of the patterns may be created using combinations of different line code technology. For example, line patterns that include multiple line segments may be created and applied at ID card 602 using offset printed line code technology, xerographic or inkjet line code technology, spectral line code technology, multi-layer line code technology, optical density line code technology, laser engraving/Lasink line code technology, or combinations of each.

System 600 generally includes a line segment module 608 that executes programmed instructions for applying line patterns at an ID card 502. In some implementations, module 608 is one of multiple devices that each interact to manufacture physical identification cards or to generate/create digital identification cards. As descried in more detail below, module 608 generally includes spectral synthesizer 622, depth/layer synthesizer 624, and optical density/width synthesizer 626. Each of synthesizers 622, 624, and 626 may correspond to computing devices or programmed code/software instructions for executing the above described spectral line code technology, multi-layer line code technology, and optical density line code technology, respectively. While in typical implementations, each of synthesizers 622, 624, 626 is encoded on computer-readable media, in some implementations, these computing features are included within module 608 as a sub-system of hardware circuits that include one or more processing devices or processor microchips.

In general, module 608 may include processors, memory, and data storage devices that collectively form modules and computer systems of module 608. Processors of the computer systems process instructions for execution by module 608, including instructions stored in the memory or on the data storage device to display graphical information for output at an example display monitor of system 600. Execution of the stored instructions may cause one or more of the actions described herein to be performed by module 608. In other implementations, multiple processors may be used, as appropriate, along with multiple memories and types of memory. For example, module 608 may be connected with multiple other computing devices, with each device (e.g., a server bank, groups of servers, modules, or a multi-processor system) performing portions of the actions, operations, or logical flows described in this specification. Module 608 may also be connected to one or more lasers to send instructions to the lasers to perform laser engraving on card 602 according to a particular template, design, or pattern.

As used in this specification, and with reference to line segment module 608, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

Referring again to FIG. 6, module 608 leverages various line code technologies to create distinct types of line patterns that may be included at ID card 502. For example, module 608 may use spectral synthesizer 622 to print line code (e.g., line patterns and corresponding line segments) in ultraviolet (UV) or general fluorescing colors and spanning multiple excitation wavelengths. In some implementations, synthesizer 622 is used for frequency modulating the excitation wavelengths for multiple line code prints and patterns. For example, synthesizer 622 may be used to generate line patterns at ID card 502 based on materials and features that exhibit different color attributes in response to excitation.

As described below, user credentials and other sensitive information may be obtained by recording or analyzing excitation patterns of line code/segments that fluoresce under certain light conditions. Hence, module 608 may be used to write or apply line code that includes line patterns/data that fluoresces when exposed to UV light rays and infrared (IR) light rays. In some implementations, synthesizer 622 is used to print line patterns and corresponding line segments using IR fluorescing pigments/dyes. Module 608 may be configured to vary the excitation wavelengths that relate to line code applied at ID card 502 and vary the spectral aspects of visible and IR and UV fluorescent wavelengths (spectra). In general, line code that fluoresces under certain light conditions may be applied to ID card 502 in combination with other types of line code, such as optical density line code. Hence, various types of spectral based line code can be printed on top of, or in combination with, existing visible line code patterns applied at ID card 502.

Module 608 may use depth/layer synthesizer 624 to apply/write line code at different layers within a card structure at various widths/thicknesses. For example, synthesizer 624 may determine whether a line code is to be implemented on a surface or subsurface of card 502, identify one or more layers of ID card 502, determine the type of line code and corresponding line pattern to applied to particular layers of card 502 (including line segment width and depth), and execute computing processes which cause the line code to be applied at a particular layer of card 502. In some implementations, synthesizer 624 is used to apply line code to one or more layers of card 502 so as to maximize the amount of user credential data that may be encoded at the document. For example, module 608 may use an angular write (or read discussed below) mechanism to write line code data in one or more layers of the ID card 502.

System 600 may use module 608 to write line code (and read line code, using a decoder) at an edge of ID card 502. In some implementations, a card or document is shaped and configured to create edge features that are favorable for applying/writing line code data. For example, cuts or changes to edge contours of a card can be minimized in order to create edge features that are favorable for receiving line code. In some instances, edges of ID card 502 may be sensitized in order to create favorable edge features so that line segment data may be appropriately applied to the edge.

Line patterns and line segments (line code) applied to inner layers of ID card 502 may be positioned at a lower depth within the ID card 502 relative to line code applied at a surface of the document. As described in more detail below, a decoding device may be configured to read encoded line pattern data on the different layers of ID card 502. For example, the device may determine a depth of each layer of the ID card 502 and then scan/analyze line pattern data included at the depth. In some implementations, system 600 may include a module or device that has an angular write/read mechanism for writing line code at inner layers (e.g., lower depths relative to a surface layer) of ID card 502 and reading line code applied to the inner layers.

Module 608 may leverage multiple types of line code technology to apply static spectral based line code (e.g., excitation from UV/IR light rays) as well as to apply line code to ID card 502 using laser etching/engraving processes (e.g., for a Lasink personalizing process). In some implementations, system 600 uses printing resources, such as dye diffusion thermal transfer (D2T2) or inkjet resources, to apply static spectral based line code to ID card 502. In other implementations, items and materials generating line code associated with UV spectral features may be printed at a layer of ID card 502 and then blocked with kinegram/foil. For example, the materials may be printed at the layer and then blocked with kinegram/foil to etch away portions of the material in order to generate the curved line code around a particular design.

Module 608 may use optical density/width synthesizer 626 to add pixelation points of varying density between existing line segments and determine the width of line segments. In some implementations, an ID document may include existing sets of line patterns (first line patterns) with line segments that are spaced apart. The first line segments may be generated using line code technology that differs from pixelation density increment technology described herein. Techniques described in this document include using the spacing between the line segments of the first line patterns to embed additional data based on the added pixelation points. In some implementations, device 608 may select a range of density increments for the added pixelation points (e.g., between 0.4 and 2.0 OD, with increments from 0.4, 0.8, 1.2, 1.6 and 2.0). In some instances, device 608 may use five levels of density so that each level is assigned a value and each value is easily discriminated from all of the other optical densities.

In general, line patterns may be based on differences in optical density (OD) of pixels that depict data included in ID card 502. Line patterns that are created using this pixelation process are embedded in an ID card (e.g., at a particular layer of the card) and are used to encode personal information based on density increment technology. Individual pixels are selected to carry data by assigning certain optical density levels that are ascribed to numerical or letter values. An increment of optical density ("OD") is selected so that a computing device (e.g., a machine for reading/scanning data) may differentiate between various pixels that form line patterns based on their adjusted or incremented optical density.

In some implementations, the optical density/width synthesizer 626 may use a wave function of laser engraving (e.g., a laser) to control the laser width and a line segment width. Various suitable wave functions may be used. For example, a $1/X^2$ function or a sinewave to a full curl (360° with crossover back to the origination x or y axis, traveling at a distance on the same or alternate axis) function may be used. The wave function may be applied to the mathematical function of a pattern (e.g., lines, guilloches, text) to be implemented on the card 502.

For a physical ID card 502, YAG laser engraving may be used to generate line patterns that include separate pixels with gradations or increments in their optical density. In some implementations, color pixilation may be used in addition to optical density. In other implementations, module 608 may be used to apply a metalized thin film at an area of ID card 502. The thin film may be a kinegram or metalized hologram that is applied over UV ink, IR ink, and other color inks. The thin film may cover and conceal the inks underneath. A YAG laser may be used to de-metalize the thin metal film based on a line code/line pattern format. By changing the line width (e.g., using the wave function) and length in combination with the colors underneath the thin film, variable information may be encoded into the area of the ID card.

Module 608 may write line code within an existing line based on fixed or variable line spacing. For example, module 608 may write a line segment at 1.4 OD and then write a different segment at 1.9 OD (higher incremental OD). The OD should be increased with incremental line densities (regardless of color) so that an example decoding device or line code reader may distinguish between these different two line segments. In some implementations, module 608 may also use a signal strength that correlates to the intensity and may super impose data using the UV/IR spectral features to generate line code as described above.

In some implementations, Lasink laser technology may be used to apply line code to layers of ID card 502 using one or more the processes described above (e.g., multi-layer line patterns, edge patterns, Lasink preprint lines for different color/wavelength bands, etc.). In some implementations, new sets of spectral/UV based preprint lines can be generated using the R, G, B color model (or visible C, Y, M lines). In this implementation, line patterns may be applied to ID card 502 by using laser engraving with white UV fluorescing ink to cancel out certain colors.

Figure 8:
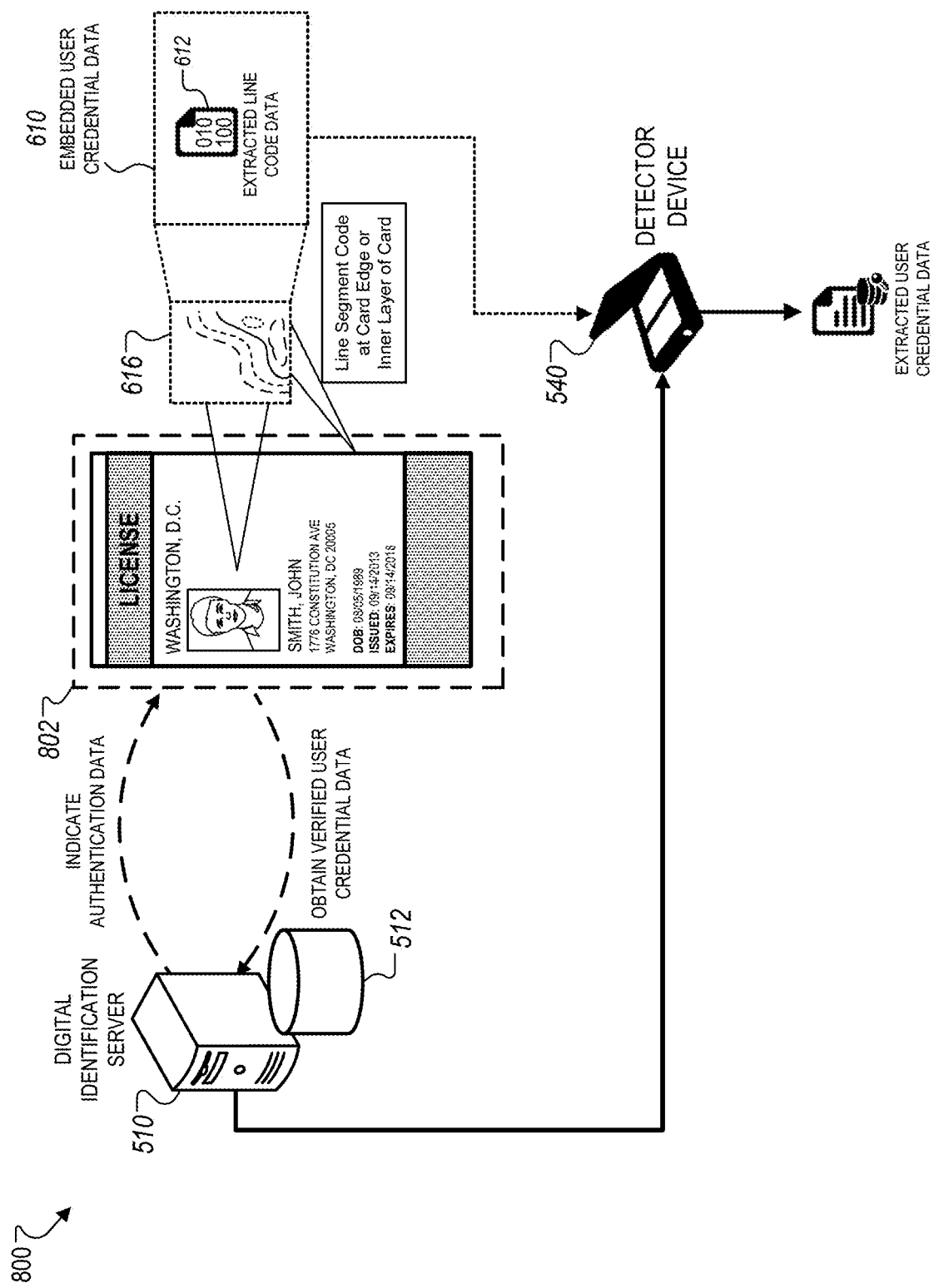
FIG. 8 illustrates an example of a system for verifying an identification document based on data extracted from embedded line patterns of the identification document in accordance with the second implementation.

Using the described techniques, module 608 may create line patterns 616a and 616b, where the patterns are formed based on the different line code technology described above. For example, line pattern 616a may correspond to line patterns generated using synthesizer 622 and having line segments with different spectral features or based Lasink laser engraving, as described above. Line pattern 616b may correspond to a line pattern with line segments that each have the same lengths but different optical densities and/or thicknesses. Although straight lines are shown, with the use of a wave function, curved line segments may also be implemented on card 502 with greater resolution and accuracy. As shown at FIG. 8 (described below), line patterns 616 embedded at a physical or digital ID document may be formed using a series of curved lines that create the appearance of a wave going across the face of the ID document.

In FIG. 6, ID card 502 may include example line patterns 616a/b embedded in ID card 502 (e.g., at inner layers of a card or at edges of the card). As shown in FIG. 6, line patterns 616a/b correspond to encoded data that is scanned and used to generate an example binary data sequence that includes "01001 00110" (or more bits, e.g., 1-bit to 1,000 bits). In some instances, encoded line data may be decoded, in part, by scanning or capturing an image of an example identification article (e.g., ID card 502) with a computing device such as a smartphone, a digital camera, or a laptop computing device. The example binary data sequence may be processed using a detector device (e.g., detector device 540 described below) to authenticate the identification or to verify the identity of the card holder. Thus, line patterns embedded within an identification article may be scanned to extract and process encoded data to provide enhanced identification verification.

Figure 7:
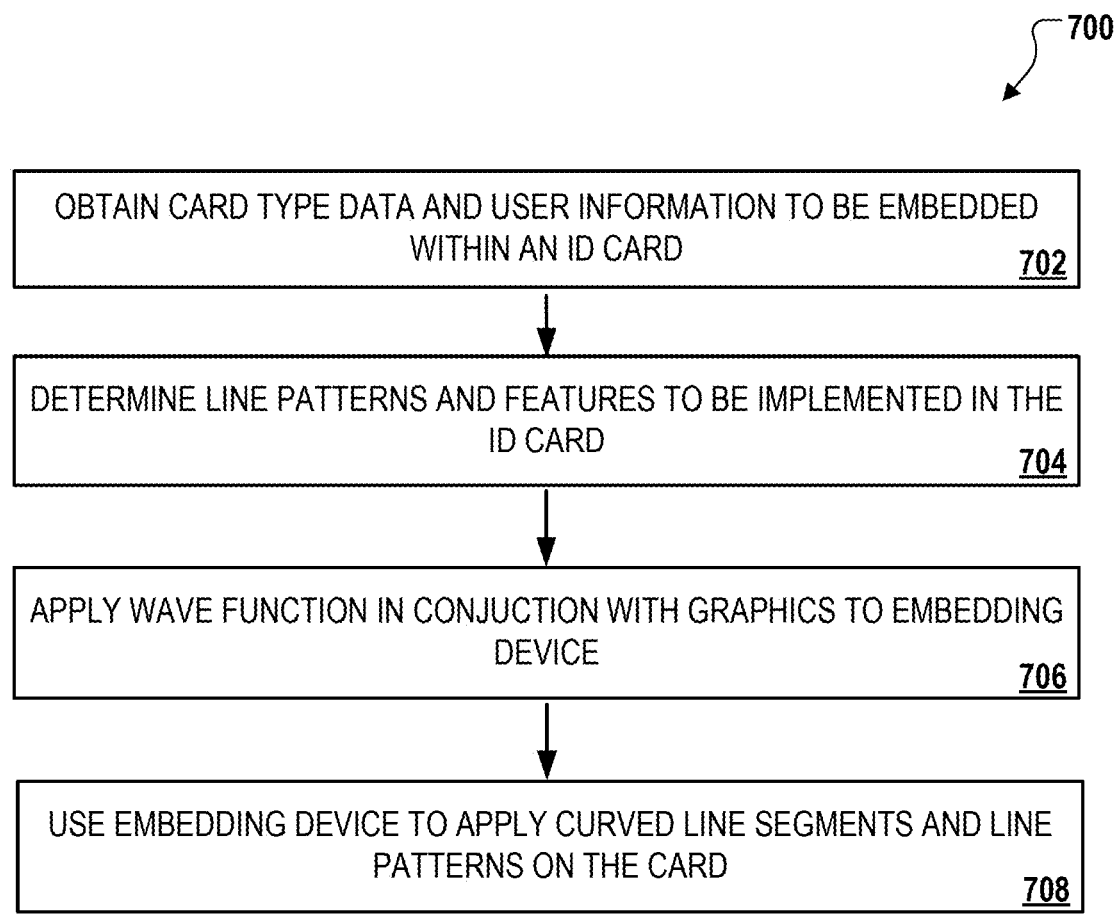
FIG. 7 shows a flow diagram of an example process for embedding information using one or more curved line segment coding features.

FIG. 7 shows a flow diagram of an example process 700 for embedding line segment data in a credential. Process 700 can be implemented or executed using the systems and devices described above in this specification. In some implementations, the described operations of process 700 are enabled by computing logic or programmed instructions executable by processing devices and memory of computing resources described in this specification.

To embed line segment data in a credential, a system, such as system 600, 800, or 1000 described with respect to FIGS. 6 (above), 8 (below), and 10 (below), respectively, may obtain data indicating the card type and user information to be embedded within the card (702). For instance, after receiving an order for a particular card type, user information to be embedded into the card may be obtained from a digital identification server and/or a digital identification database based on the card type. For instance, if a membership card is to be created, a user's name and membership information may be obtained. If a driver's license is to be created, a user's name, license number, and address may be obtained from a secure database, such as a government database, that provides such information.

After obtaining the information, the system may determine the line patterns and features to be implemented in the ID card (704). As part of this operation, the system obtains a template for the card type, and determines which layers to embed user information into and the types of patterns, line segments, or designs (e.g., artwork, text images) to be implemented based on the card type. For instance, line patterns may be selected based on the coding patterns specified by the line pattern repository 508 (described above). The selections of patterns and information to be embedded varies for different cards. For example, for some cards, a portion of the card may be designated for a user image with embedded layers of personal user information, whereas, in other cards, there may be no portion of the card allocated for a user image or an image with embedded user information.

In some implementations, curved lines may be implemented on a card. In such cases, a wave function in conjunction with the graphics to be implemented on the card are applied to control an embedding device such as a laser (706). For example, for some cards, graphics such as logos, guilloches, or images that include curved lines may have to be implemented on the card. A wave function, e.g., $1/X^2$ or a sinewave, may be used to implement the curved lines of the graphics. When a laser, such as a YAG laser is being used to perform laser engraving to embed information into the card, the wave function may be applied via control signals to the laser to control movement of the laser while engraving the card. The control signals may also include coordinate data for identifying the locations of graphics and line segments with reference to an XY plane of the card.

By using the waveform to control the laser engraving, the density, thickness, and overall accuracy of laser engraving of curved line segments may be enhanced. As an example, dark regions of the customer photograph can include curved line segments with larger thicknesses and/or smaller spacing distances between line segments, and lighter regions of the customer photograph can include curved line segments with smaller thicknesses and/or larger spacing distances.

Figure 9:
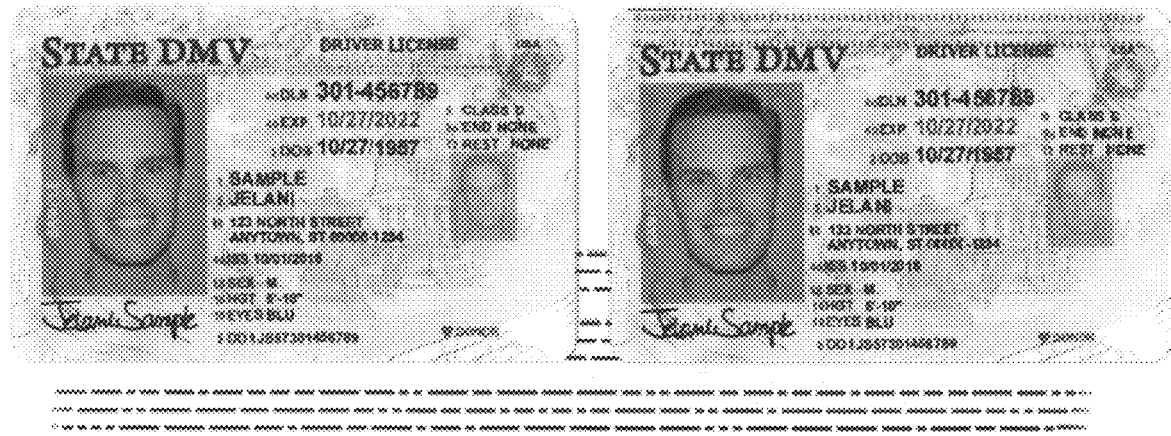
FIG. 9 depicts examples of cards implemented with curved line codes according to the second implementation.
Figure 9:
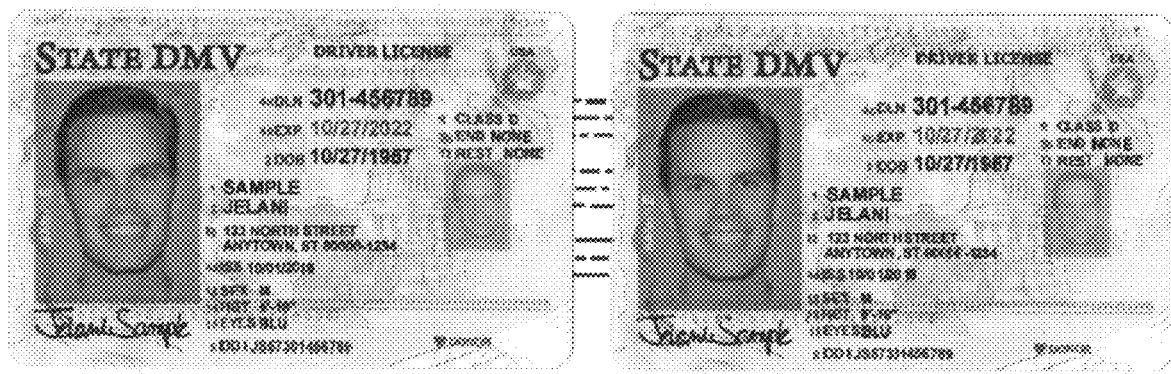

After receiving the control signals, the embedding device may then generate the card by applying the curved line segments and line patterns onto the card (708). The line segments are applied at particular layers of the card according to the type of card. FIG. 9 depicts prototypes of the finely detailed curvatures available of being produced via YAG.

FIG. 8 illustrates an example of a system 300 for verifying an identification document based on data extracted from embedded line patterns of the ID card 802. Identification server 510 initially obtains secure customer information using different techniques. In some instances, the secure customer information may be obtained during the enrollment process when the customer is requested to verify his identity by providing personally identifiable information (e.g., driver license number, user authentication information, etc.). The obtained customer information may then be stored and associated with designated line patterns.

Line pattern repository 508 maps specific line patterns that are embedded within the ID card 802 to pieces of secure information obtained by the identification server 510. The line pattern repository 508 thus enables the identification of a corresponding piece of secure customer information based upon the detection of an embedded line pattern within the ID card 802. The line pattern repository 508 may be stored in the digital identification database 512, and subsequently transmitted to authorized devices, such as detector device 540, that perform verification of the ID card 802.

During a verification operation of ID card 802, the detector device 540 initially scans or interprets line pattern data 612 within the ID card 802. ID card 802 may be displayed as a digital representation through a display of a portable electronic device such as a mobile phone, laptop, or electronic pad, or may be presented to a credential verifying authority in a physical form, such as a physical ID card. Scanning of the ID card 802 may be accomplished using various types of optical recognition techniques. For instance, the detector device 540 may include an optical camera or optical scanner configured to scan or obtain an image of the ID card 802. The detector device 540 may be configured to detect designated line patterns included within the line pattern repository 508. During a scan of the ID card 802, the detector device 540 may identify the presence of the designated line patterns, and extract the identified line patterns as the extracted line pattern data 612. The line pattern data 612 may specify a coordinate location (e.g., in an XY plane) within the digital identification where a particular line pattern is detected.

The detector device 540 may be configured to perform ablation of line patterns and line segments included at a credential surface or layer of ID card 802. For example, the detector device 540 may perform ablation of line patterns and line segments to read reflective light patterns associated with the line segments. As used herein, ablation relates to extracting data based on readings determined from analyzing reflecting light patterns. As described above, user credentials and other sensitive information can be obtained by recording or analyzing excitation patterns of line code/segments that fluoresce under certain light conditions. For example, the detector device 540 may include a decoder configured to decode encoded line pattern data 612 by recording or analyzing excitation patterns of the line code features included in card 802.

The detector device 540 can be configured to read line code at different angles or based on the angular placement of the detector device 540 relative to a layer or edge of ID card 802 that includes the line code. For example, when the detector device 540 is positioned at 0 degrees nominal, the detector device 540 may not be able to read or interpret line code applied at a lower depth layer. However, when the detector device 540 is positioned at 45 degrees, the detector device 540 can detect and interpret one or more types of line pattern data.

The detector device 540 can then obtain secure credential data assigned to the extracted or interpreted line pattern data 610 using the information specified within the line pattern repository 508. For instance, the detector device 540 may cross-reference each of the detected line patterns indicated by the extracted line pattern data 610 with the line patterns that are specified within the line pattern repository 508 in order to determine the pieces of personal or credential information assigned to each line pattern. The detector device 540 can verify the claimed identity based on the extracted credential information 612 to verify the authenticity of the ID card 802 as well as the identity of the cardholder. In some implementations, there may be a need to create a registration mark or pattern sensing device in the credential that supplements the capture and read process— for example—if a curve (1/y) is being used then the x=1/y curve can prove useful as a register mark.

In some examples, the features, processes, and systems described in reference to FIGS. 1A-4 can be combined with those described in reference to FIGS. 5-9. For example, a given identification document can include both spiral and curved line codes.

Figure 10:
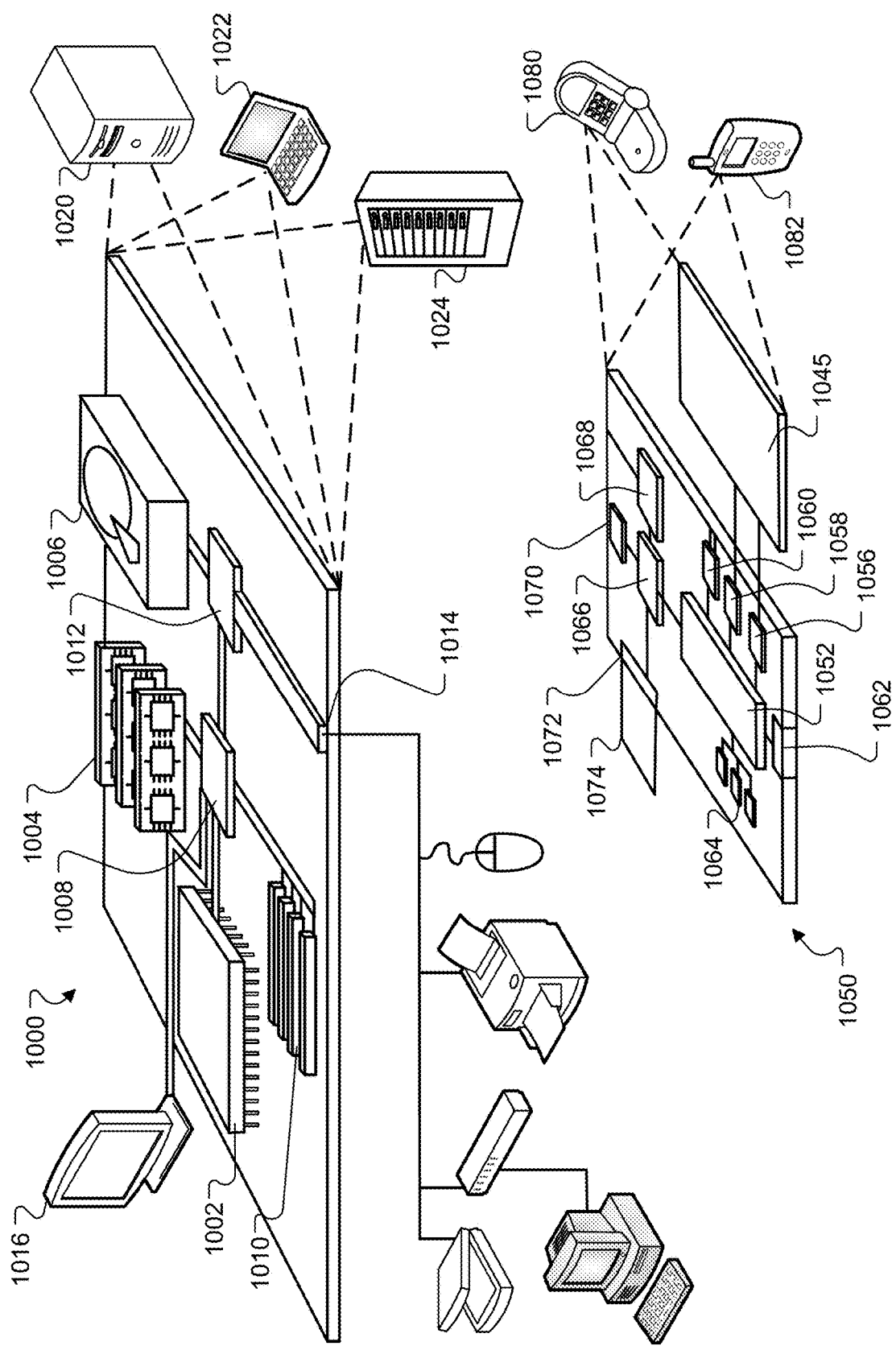
FIG. 10 shows a block diagram of a computing system that can be used in connection with computer-implemented methods described in this specification.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 1000 includes a processor 61002, memory 1004, a storage device 1006, a high-speed interface 1008 connecting to memory 1004 and high-speed expansion ports 1010, and a low speed interface 610161012 connecting to low speed bus 1014 and storage device 1006. Each of the components 61002, 1004, 1006, 1008, 1010, and 610161012, are interconnected using various busses, and may be mounted on a common motherboard or in other manners as appropriate. The processor 61002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations, e.g., as a server bank, a group of blade servers, or a multi-processor system.

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 61002.

The high speed controller 1008 manages bandwidth-intensive operations for the computing device 1000, while the low speed controller 610161012 manages lower bandwidth-intensive operations. Such allocation of duties is exemplary only. In one implementation, the high-speed controller 1008 is coupled to memory 1004, display 1016, e.g., through a graphics processor or accelerator, and to high-speed expansion ports 1010, which may accept various expansion cards (not shown). In the implementation, low-speed controller 610161012 is coupled to storage device 1006 and low-speed expansion port 1014. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 5020, or multiple times in a group of such servers. It may also be implemented as part of a rack server system 5024. In addition, it may be implemented in a personal computer such as a laptop computer 5022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 61052, memory 5064, an input/output device such as a display 1054, a communication interface 5066, and a transceiver 5068, among other components. The device 1050 may also be provided with a storage device, such as a microdrive or other device, to provide additional storage. Each of the components 1050, 61052, 5064, 1054, 5066, and 5068, are interconnected using various buses, and several of the components may be mounted on a common motherboard or in other manners as appropriate.

The processor 61052 can process instructions for execution within the computing device 1050, including instructions stored in the memory 5064. The processor may also include separate analog and digital processors. The processor may provide, for example, for coordination of the other components of the device 1050, such as control of user interfaces, applications run by device 1050, and wireless communication by device 1050.

Processor 61052 may communicate with a user through control interface 1058 and display interface 1056 coupled to a display 1054. The display 1054 may be, for example, a TFT LCD display or an OLED display, or other appropriate display technology. The display interface 1056 may include appropriate circuitry for driving the display 1054 to present graphical and other information to a user. The control interface 1058 may receive commands from a user and convert them for submission to the processor 61052. In addition, an external interface 5062 may be provided in communication with processor 61052, so as to enable near area communication of device 1050 with other devices. External interface 5062 may provide, for example, for wired communication, e.g., via a docking procedure, or for wireless communication, e.g., via Bluetooth or other such technologies.

The memory 5064 stores information within the computing device 1050. In one implementation, the memory 5064 is a computer-readable medium. In one implementation, the memory 5064 is a volatile memory unit or units. In another implementation, the memory 5064 is a non-volatile memory unit or units. Expansion memory 1074 may also be provided and connected to device 1050 through expansion interface 61072, which may include, for example, a SIMM card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 5064, expansion memory 1074, or memory on processor 61052.

Device 1050 may communicate wirelessly through communication interface 5066, which may include digital signal processing circuitry where necessary. Communication interface 5066 may provide for communications under various modes or protocols, such as GSM voice calls, SMS, EMS, or MMS messaging, CDMA, TDMA, PDC, WCDMA, CDMA6000, or GPRS, among others. Such communication may occur, for example, through radio-frequency transceiver 5068. In addition, short-range communication may occur, such as using a Bluetooth, WiFi, or other such transceiver (not shown). In addition, GPS receiver module 1070 may provide additional wireless data to device 1050, which may be used as appropriate by applications running on device 1050.

Device 1050 may also communicate audibly using audio codec 5060, which may receive spoken information from a user and convert it to usable digital information. Audio codec 5060 may likewise generate audible sound for a user, such as through a speaker, e.g., in a handset of device 1050. Such sound may include sound from voice telephone calls, may include recorded sound, e.g., voice messages, music files, etc., and may also include sound generated by applications operating on device 1050.

The computing device 1050 may be implemented in a number of different forms, as shown in the figure. For example, it may be implemented as a cellular telephone 5080. It may also be implemented as part of a smartphone 5082, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. An identification document comprising:
 a photographic image of an individual associated with the identification document; and
 a spiral pattern applied to a region of the identification document, the spiral pattern comprising an elliptical spiral segmented into a plurality of arc segments, wherein the arc segments are portions of a continuous line converging on a center position of the spiral pattern;
 wherein the plurality of arc segments of the spiral pattern encode identification data associated with the individual.

2. The identification document of claim 1, wherein the plurality of arc segments of the spiral pattern encode a web address.

3. The identification document of claim 1, characteristics of the spiral pattern encode authentication data, and the characteristics of the spiral pattern include a center position and an orientation.

4. The identification document of claim 1, wherein the plurality of arc segments comprise:
 a first arc segment having a first arc length; and
 a second arc segment spaced from first arc segment, the second arc segment having a second arc length greater than the first arc length.

5. The identification document of claim 1, wherein the spiral pattern is overlaid on a background of the identification document.

6. The identification document of claim 1, wherein the identification document is a physical identification card.

7. The identification document of claim 6, wherein the spiral pattern is printed on a layer of the identification document.

8. The identification document of claim 1, wherein the spiral pattern is based on a polar to Cartesian coordinate conversion comprising the following relationship:

$$x(t)=u(t)*\cos(\phi)-v(t)*\sin(\phi)+Cx,$$

$$y(t)=u(t)*\sin(\phi)+v(t)*\cos(\phi)+Cy,$$

wherein x(t) and y(t) are Cartesian coordinates representing dimensions on the document, and wherein u(t) and v(t) are polar coordinates representing of the spiral pattern.

9. The identification document of claim 1, further comprising a segmented line pattern having a wave shape.

10. A method of verifying documents, the method comprising:
 obtaining an image of a document;
 identifying, within the image, a spiral pattern applied to a region of the document, wherein the spiral pattern comprises an elliptical spiral segmented into a plurality of arc segments, wherein the plurality of arc segments are portions of a continuous line converging on a center position of the spiral pattern;
 determining, from the spiral pattern, spiral data that indicates characteristics of the spiral pattern;
 determining, based on the spiral pattern and the spiral data, secure information of an individual associated with the document; and
 verifying the document based on the secure information.

11. The method of claim 10, wherein the spiral data includes a list of multiple spiral patterns identified on the document.

12. The method of claim 11, wherein verifying the document comprises determining that the spiral data corresponds with expected spiral patterns from a spiral pattern repository.

13. The method of claim 11, wherein determining the secure information comprises:
   determining, based on the characteristics of the spiral pattern, arc lengths associated with at least a subset of the plurality of arc segments; and
   determining the secure information from the arc lengths of the subset of arc segments.

14. The method of claim 13, wherein determining the secure information from the arc lengths of the subset of arc segments comprises:
   determining digital data represented by the plurality of arc lengths of the subset of arc segments; and
   determining the secure information from the digital data.

15. The method of claim 13, further comprising providing, for display to a user, the secure information.

16. The method of claim 13, wherein the characteristics of the spiral pattern comprise a location of a center point of the spiral pattern on the document and wherein the center point of the spiral pattern indicates a direction for reading the secure information from the arc lengths.

17. The method of claim 10, wherein the characteristics of the spiral pattern comprise a location of a center point of the spiral pattern on the document.

18. A computer-implemented method, comprising:
   obtaining card type data and/or user data to be embedded in a document;
   determining one or more line features to be implemented in the document;
   determining a wave function associated with a graphic to be implemented in the document; and
   controlling by control signals an embedding device to embed user data in the document based on the one or more line features and the wave function, wherein controlling by control signals comprises applying the wave function to a control movement of a laser while engraving the document, wherein the control signals comprise coordinate data for identifying locations of graphics and line segments with reference to an XY plane of the document.

19. The method of claim 18, further comprising:
   obtaining verified credential information associated with a holder of the document;
   encoding the verified credential information within a pattern of line segments;
   converting line segments in the pattern of line segments into arc segments by applying a set of spiral characteristics to provide a spiral pattern; and
   applying the spiral pattern to a region of the document.

20. The method of claim 19, wherein the spiral characteristics comprise a spiral controlled orientation ($\phi$) and a center point (Cx,Cy), and wherein converting line segments in the pattern of line segments into arc segments comprises generating the spiral pattern based on a polar to Cartesian coordinate conversion comprising the following relationship:

$$x(t)=u(t)*\cos(\phi)-v(t)*\sin(\phi)+Cx,$$

$$y(t)=u(t)*\sin(\phi)+v(t)*\cos(\phi)+Cy,$$

wherein x(t) and y(t) are Cartesian coordinates representing dimensions on the document, and wherein u(t) and v(t) are polar coordinates representing of the spiral pattern.

* * * * *